US008668058B2

(12) United States Patent
Lu et al.

(10) Patent No.: US 8,668,058 B2
(45) Date of Patent: Mar. 11, 2014

(54) VENTED DISC BRAKE ROTOR

(75) Inventors: Jian Lu, Ballwin, MO (US); George Robert Schmidt, St. Louis, MO (US)

(73) Assignee: Federal-Mogul Worldwide, Inc., Southfield, MI (US)

( * ) Notice: Subject to any disclaimer, the term of this patent is extended or adjusted under 35 U.S.C. 154(b) by 1056 days.

(21) Appl. No.: 11/206,889

(22) Filed: Aug. 18, 2005

(65) Prior Publication Data

US 2006/0219500 A1    Oct. 5, 2006

Related U.S. Application Data

(60) Provisional application No. 60/666,667, filed on Mar. 30, 2005.

(51) Int. Cl.
F16D 65/78         (2006.01)

(52) U.S. Cl.
USPC .................................................. 188/218 XL

(58) Field of Classification Search
USPC ........ 188/18 A, 71.6, 218 R, 218 XL, 264 A, 188/264 AA, 264 R
See application file for complete search history.

(56) References Cited

U.S. PATENT DOCUMENTS

| | | | |
|---|---|---|---|
| 2,255,023 A | 9/1941 | Eksergian | 188/218 |
| 2,369,328 A | 2/1945 | Watts | 188/264 |
| 2,410,195 A | 10/1946 | Baselt et al. | 188/218 |
| 3,298,476 A | 1/1967 | Day | 188/218 |
| 3,393,776 A | 7/1968 | Ludwig | 188/218 |
| 3,933,228 A | 1/1976 | Otto et al. | 188/218 |
| 4,002,227 A | 1/1977 | Simon | 188/218 |
| 4,019,613 A | 4/1977 | Harrison | 188/218 |
| 4,026,393 A | 5/1977 | Gebhardt et al. | 188/218 |
| 4,077,051 A | 2/1978 | Vossen, Jr. | 358/128 |
| 4,083,435 A | 4/1978 | Gallus et al. | 188/218 |
| 4,108,286 A | 8/1978 | Gagarin | 188/218 |
| 4,379,501 A | 4/1983 | Hagiwara et al. | 188/218 |
| 4,523,666 A | 6/1985 | Murray | 188/218 |
| 4,550,809 A | 11/1985 | Kawaguchi | 188/18 |
| 4,596,312 A | 6/1986 | Kawaguchi | 188/18 |
| 4,638,891 A | 1/1987 | Wirth | 188/58 |
| 4,641,731 A | 2/1987 | Kawaguchi et al. | 188/218 |

(Continued)

FOREIGN PATENT DOCUMENTS

| | | |
|---|---|---|
| DE | 3536465 | 4/1987 |
| DE | 3823146 | 1/1990 |

(Continued)

Primary Examiner — Xuan Lan Nguyen
(74) Attorney, Agent, or Firm — Robert L. Stearns; Dickinson Wright, PLLC

(57) ABSTRACT

A ventilated brake rotor (24) includes vent holes (42) between inboard (32) and outboard (34) friction plates. The vent holes (42) are separated by ribs (40) spaced in regular circumferential increments about the rotor (24). The rib pattern (40) is divided into two or more sectors (48) of equal angular measure. Within each sector (48), an attenuation region (50) interrupts two or more ribs (40) by replacing the ribs (40) with a cluster of individual pins (54) which may be arranged in radial and circumferential rows. Each attenuation region (50) spans a territory within each sector (48) that is preferably at least 20% and less than 55% of the sector (48) real estate. The rotor (24) completely or at least substantially eliminates vibration modes in objectionable, audible frequencies without adversely affecting the structural integrity, cooling capabilities or functional attributes of the disc brake assembly (22).

12 Claims, 20 Drawing Sheets

(56) References Cited

U.S. PATENT DOCUMENTS

| | | | |
|---|---|---|---|
| 4,809,827 A | 3/1989 | Suzuki | 188/218 |
| 4,867,284 A | 9/1989 | Okamura et al. | 188/218 |
| 4,928,798 A | 5/1990 | Watson et al. | 188/218 |
| 5,004,078 A | 4/1991 | Oono et al. | 188/218 |
| 5,107,966 A | 4/1992 | Metzler et al. | 188/251 |
| 5,109,960 A | 5/1992 | Gunther | 188/218 |
| 5,137,123 A | 8/1992 | Setogawa et al. | 188/264 |
| 5,139,117 A | 8/1992 | Melinat | 188/218 |
| 5,161,652 A | 11/1992 | Suzuki | 188/218 |
| 5,184,663 A | 2/1993 | Oono et al. | 164/98 |
| 5,427,212 A | 6/1995 | Shimazu et al. | 188/218 |
| 5,429,214 A | 7/1995 | Wiebelhaus et al. | 188/218 |
| 5,460,249 A | 10/1995 | Aoki | 188/218 |
| 5,492,205 A | 2/1996 | Zhang | 188/218 |
| 5,526,905 A | 6/1996 | Shimazu et al. | 188/218 |
| 5,735,366 A | 4/1998 | Suga et al. | 188/218 |
| 5,823,303 A | 10/1998 | Schwarz et al. | 188/218 |
| 5,864,935 A | 2/1999 | Baumgartner et al. | 29/416 |
| 5,957,249 A | 9/1999 | Yamazaki et al. | 188/218 |
| 6,032,769 A | 3/2000 | Daudi | 188/218 |
| 6,073,735 A | 6/2000 | Botsch et al. | 188/218 |
| 6,119,820 A | 9/2000 | Steptoe et al. | 188/71.6 |
| 6,131,707 A | 10/2000 | Buechel et al. | 188/218 |
| 6,136,374 A | 10/2000 | Reuscher | 427/233 |
| 6,142,267 A | 11/2000 | Sporzynski et al. | 188/218 |
| 6,145,636 A | 11/2000 | Ikari et al. | 188/218 |
| 6,161,660 A | 12/2000 | Suga et al. | 188/218 |
| 6,164,423 A | 12/2000 | Dickerson | 188/218 |
| 6,193,023 B1 | 2/2001 | Telfer | 188/71.6 |
| 6,216,827 B1 | 4/2001 | Ichiba et al. | 188/218 |
| 6,241,055 B1 | 6/2001 | Daudi | 188/73.35 |
| 6,264,012 B1 | 7/2001 | Yamazaki et al. | 188/74 |
| 6,315,090 B2 | 11/2001 | Matsuoka et al. | 188/218 |
| 6,325,185 B1 | 12/2001 | Doi et al. | 188/218 |
| 6,334,515 B1 | 1/2002 | Martin | 188/218 |
| 6,347,691 B1 | 2/2002 | Aydt | 188/218 |
| 6,367,598 B1 | 4/2002 | Sporzynski | 188/218 |
| 6,401,880 B1 | 6/2002 | Zahdeh | 188/218 |
| 6,405,839 B1 | 6/2002 | Ballinger et al. | 188/218 |
| 6,443,269 B1 | 9/2002 | Rancourt | 188/18 |
| 6,446,770 B2 | 9/2002 | Qian et al. | 188/218 |
| 6,454,058 B1 | 9/2002 | Ballinger et al. | 188/218 |
| 6,457,566 B1 | 10/2002 | Toby | 188/1.11 |
| 6,467,590 B2 | 10/2002 | Aydt | 188/218 |
| 6,550,590 B1 | 4/2003 | Ranganathan | 188/218 |
| 6,626,273 B1 * | 9/2003 | Baumgartner et al. | 188/264 A |
| 6,655,508 B2 | 12/2003 | Ballinger et al. | 188/218 |
| 7,032,724 B1 * | 4/2006 | Hulten et al. | 188/218 XL |
| 2001/0002638 A1 | 6/2001 | Kobayashi | 188/218 |
| 2001/0019000 A1 | 9/2001 | Matsuoka et al. | 188/218 |
| 2002/0084155 A1 | 7/2002 | Ballinger et al. | 188/218 |
| 2002/0084156 A1 | 7/2002 | Ballinger et al. | 188/218 |
| 2003/0034213 A1 | 2/2003 | Qian et al. | 188/218 |
| 2004/0084261 A1 | 5/2004 | Burgoon et al. | 188/218 |
| 2004/0124046 A1 | 7/2004 | Hayes et al. | |
| 2004/0159511 A1 | 8/2004 | Meroni et al. | 188/218 |
| 2004/0163902 A1 | 8/2004 | Meroni et al. | 188/218 |

FOREIGN PATENT DOCUMENTS

| | | | |
|---|---|---|---|
| DE | 4331683 | | 3/1994 |
| EP | 0143264 | | 6/1985 |
| EP | 0318687 | | 6/1989 |
| EP | 0512853 | | 11/1992 |
| FR | 2648527 | | 12/1990 |
| GB | 2076090 A | * | 11/1981 |
| GB | 2125911 | | 7/1982 |
| GB | 2108238 | | 5/1983 |
| JP | 56063135 | | 5/1981 |
| JP | 56120833 | | 9/1981 |
| JP | 58091936 | | 6/1983 |
| JP | 58200827 | | 11/1983 |
| JP | 58221026 | | 12/1983 |
| JP | 59126124 A | * | 7/1984 |

* cited by examiner

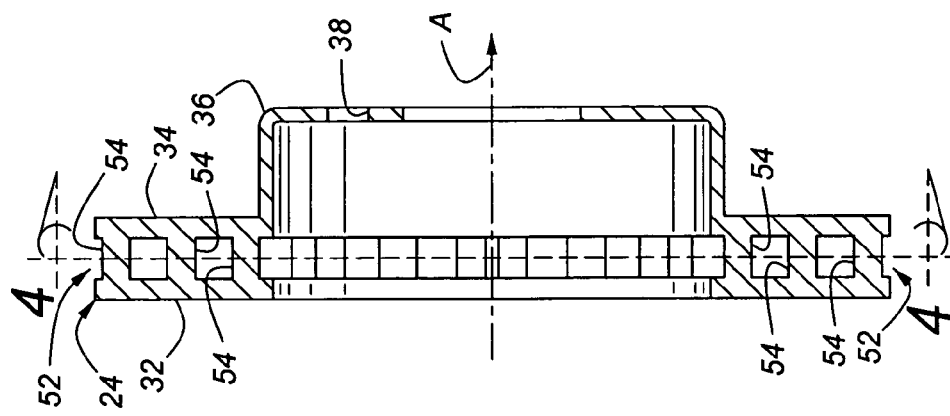
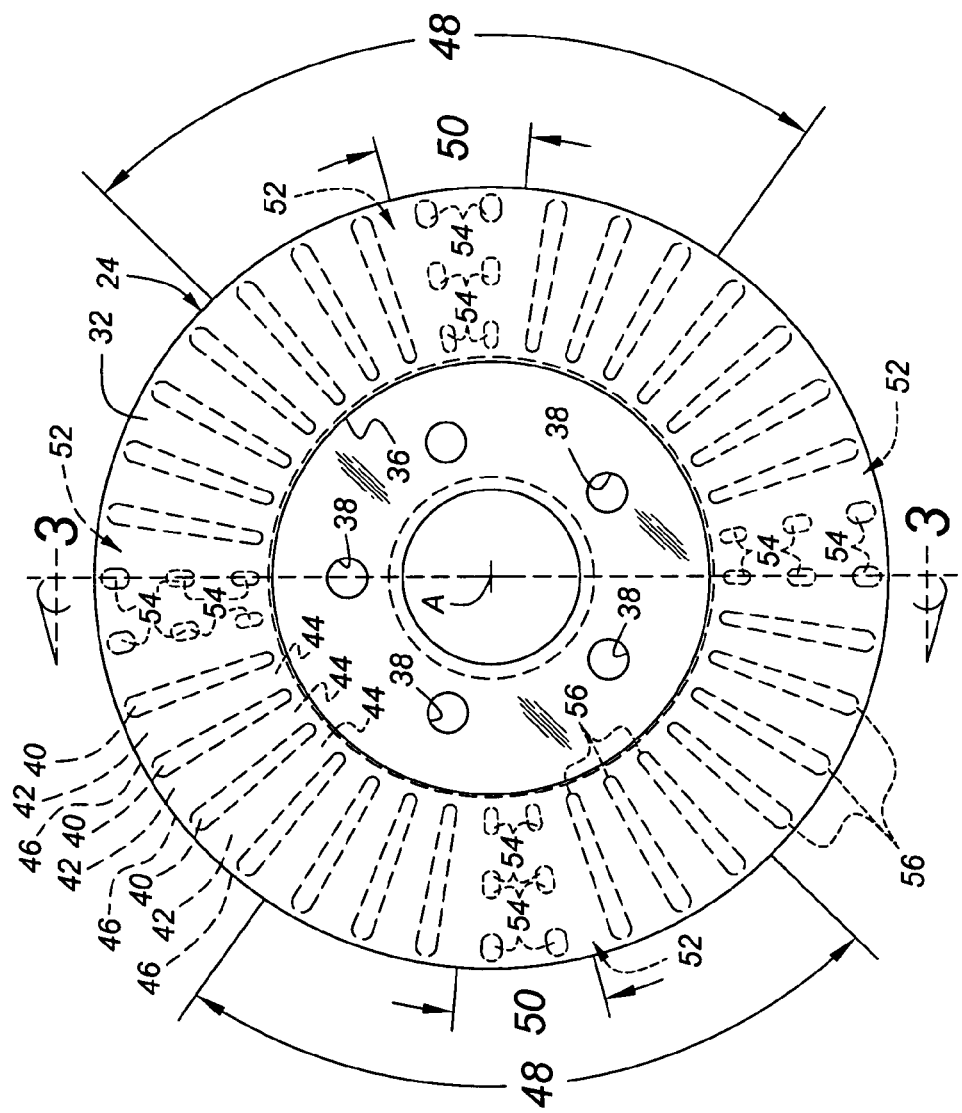

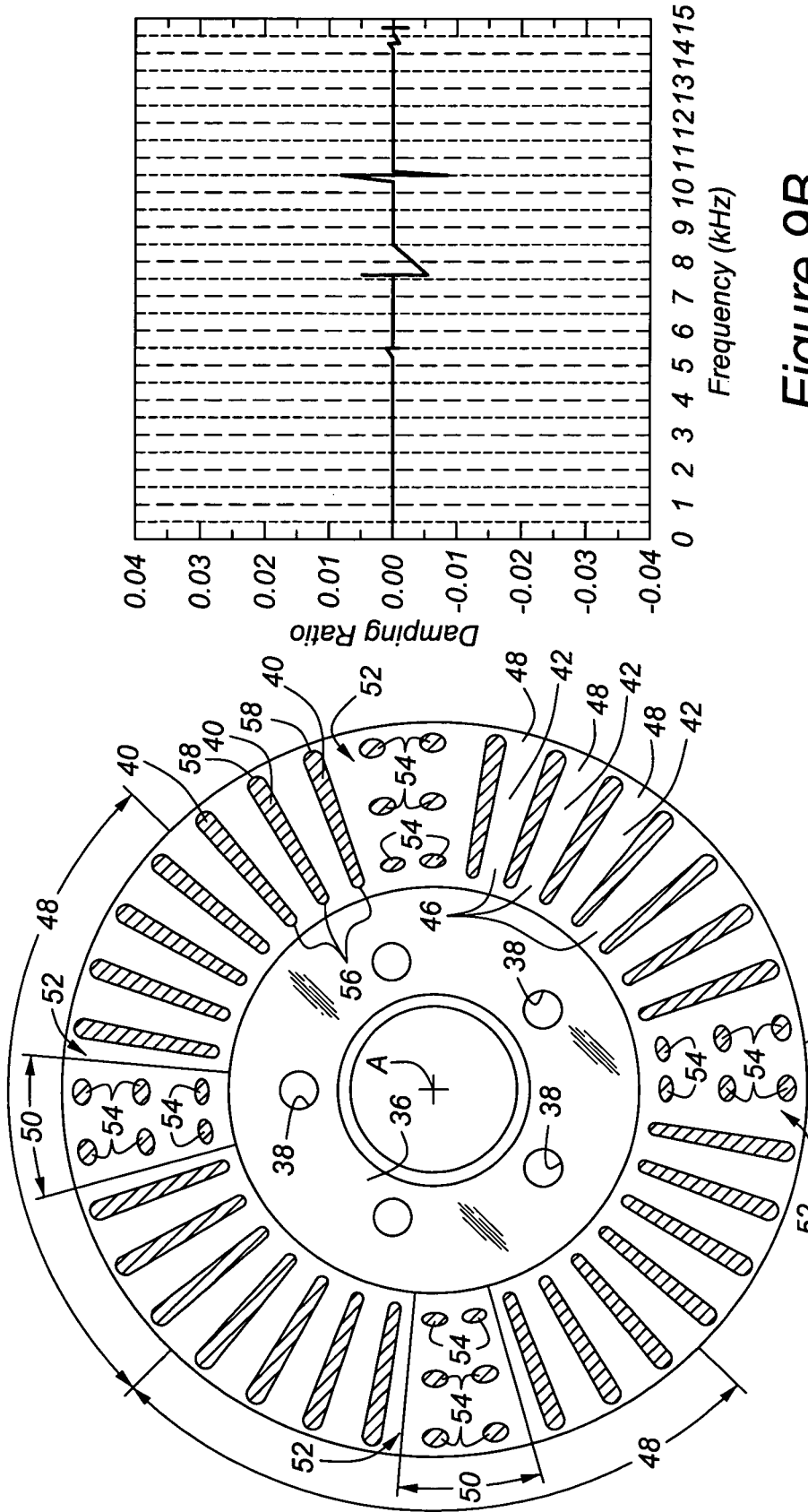

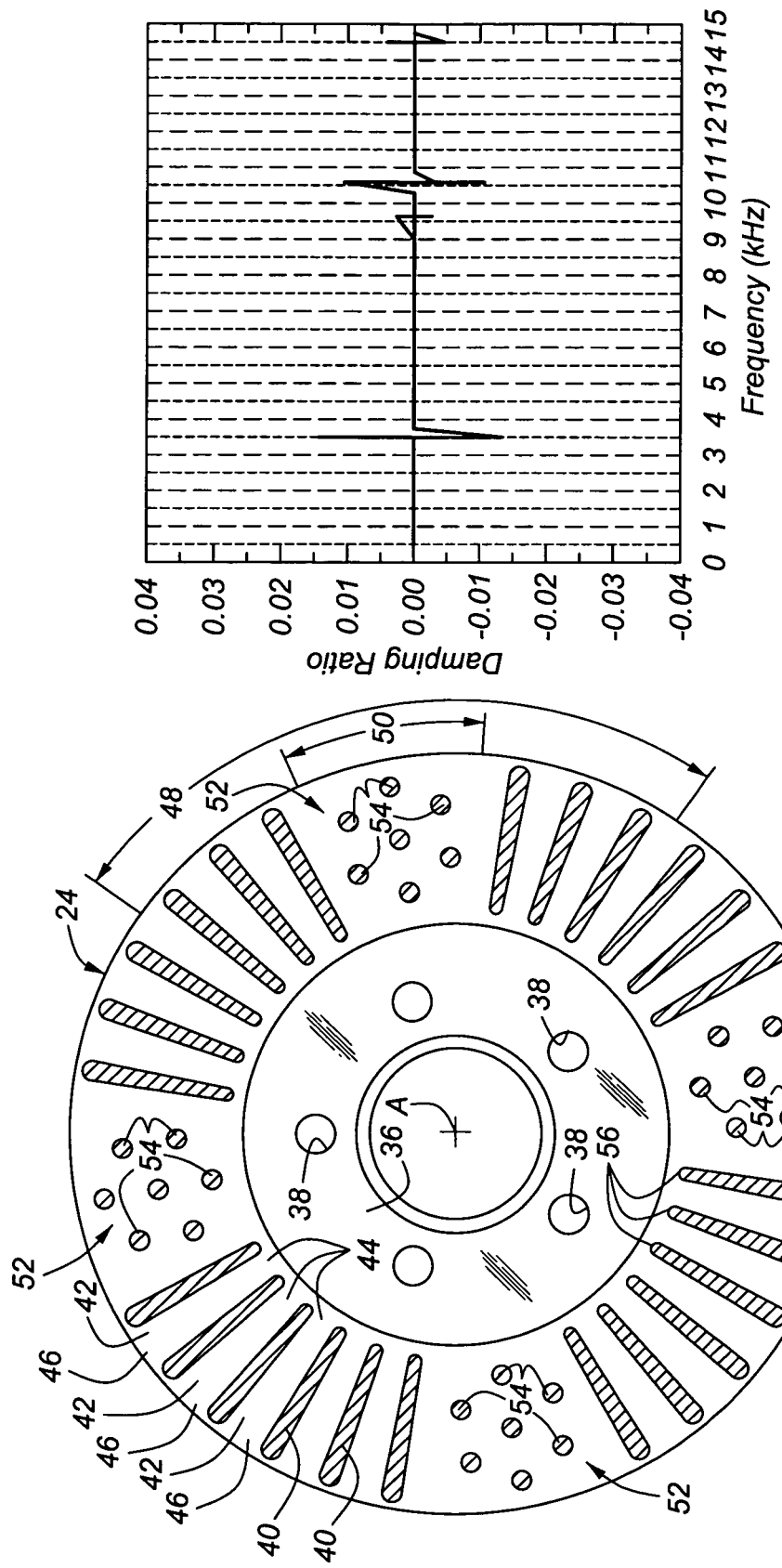

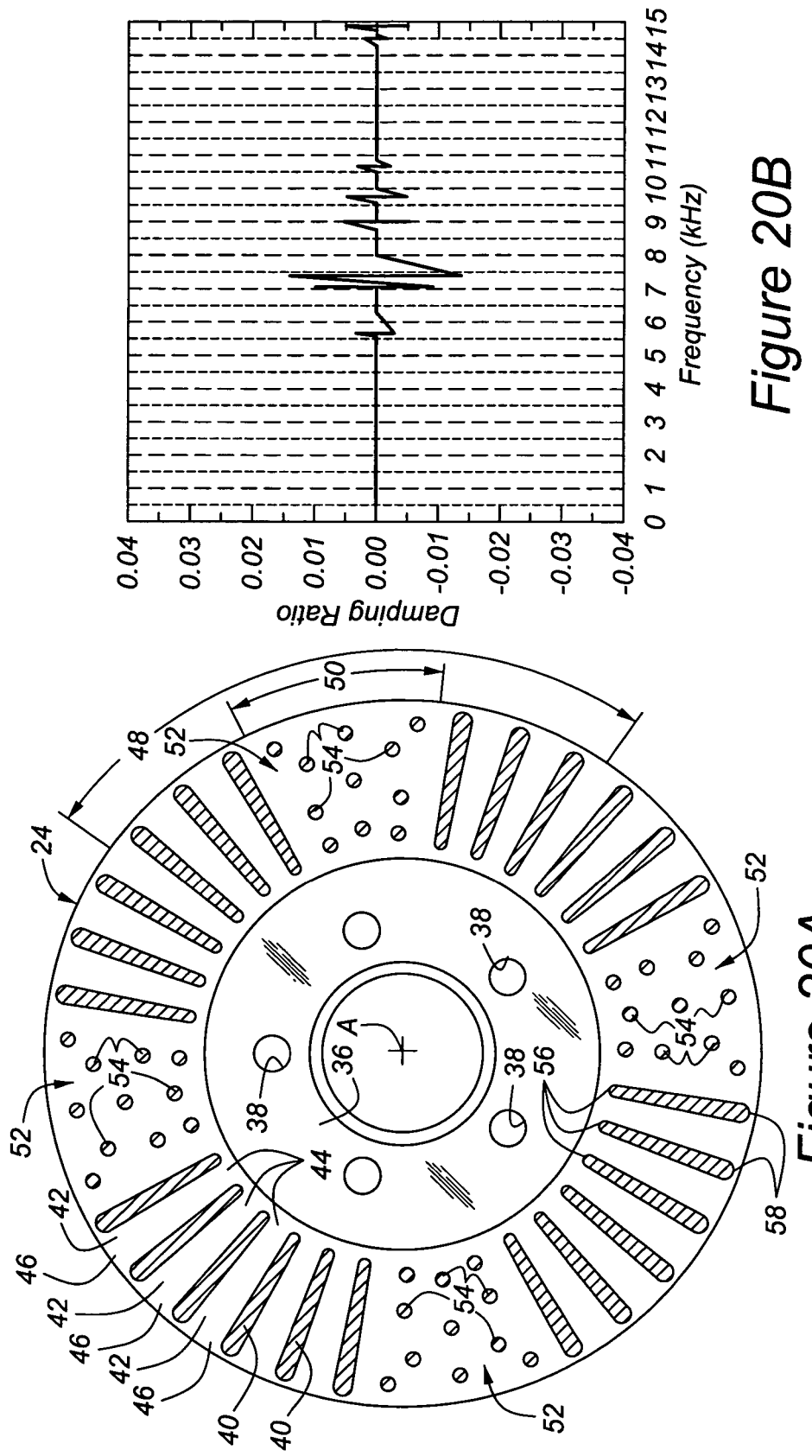

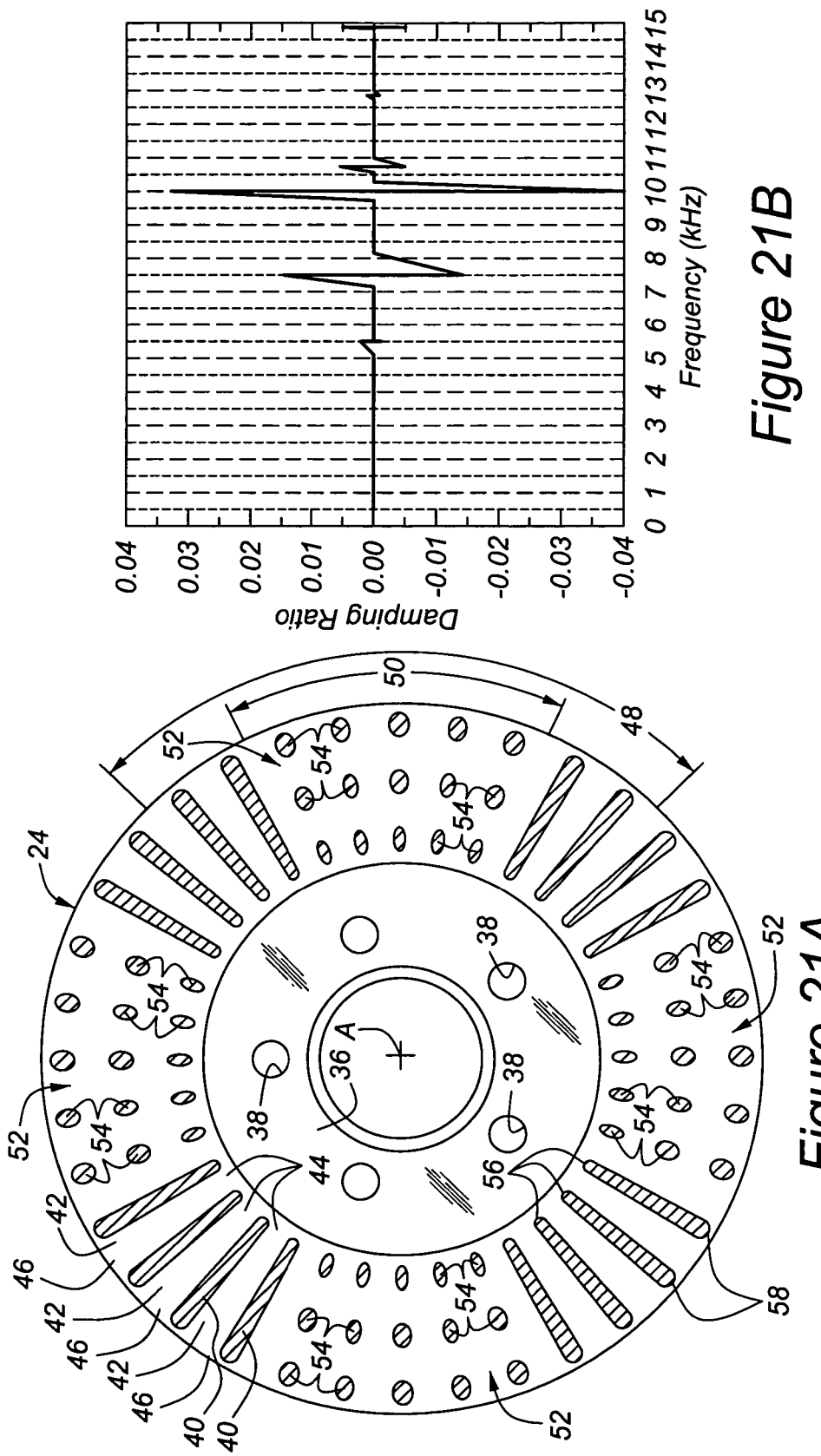

VENTED DISC BRAKE ROTOR

This application claims priority to U.S. Provisional Patent Application No. 60/666,667, filed Mar. 30, 2005 which is incorporated by reference herein in its entirety.

BACKGROUND OF THE INVENTION

1. Field of the Invention

The invention relates to a disc brake rotor, and more particularly toward a vented rotor configured to attenuate brake squeal noise.

2. Related Art

A rotor for a disc brake forms part of the vehicle braking system and rotates together with a wheel. The rotor has a pair of opposed friction surfaces against which brake pads are brought into contact to arrest rotation of the wheel. In many applications, the rotor section of the disc brake is ventilated between the friction surfaces to improve cooling characteristics by dissipating heat produced from friction during the braking process. Ventilated rotors are normally arranged so that a plurality of radially extending vent holes are formed between inboard and outboard friction plates, with structural ribs defining the sides of each vent hole.

In such arrangements, the ventilated rotor exhibits numerous vibration modes. Certain vibration modes will have a larger amplitude than others, and when the large amplitude modes occur at certain audible frequencies, in conjunction with an excitation input of like frequency, an objectionable squealing noise may be heard. The distinctive high-pitched sound of brake squeal is a friction-induced dynamic instability that is notoriously difficult to predict. Numerous variables are thought to contribute to brake squeal, including brake pressure, temperature, rotor speed, and deceleration. Other variables thought to possibly contribute to brake squeal include dust accumulation, deterioration of damping layers, variation of friction materials and contact conditions.

When the operator of a vehicle applies the brakes, a portion of the braking energy turns into vibration energy. Squeal occurs even in new vehicles when system instability causes the vibration to be self-excited, and the vibration amplitude rises increasingly higher. Although brake squeal is not indicative of a defect in the braking system, a perception of a mechanical problem is created, or a presumption that the brake has been poorly made. This negative consumer impression, albeit falsely based, is particularly harmful to vehicle manufacturers, dealers, and the makers of braking systems. Design engineers have sought to address the problem of brake squeal through various techniques and analytical methods. However, because of the numerous variables thought to contribute to brake squeal, this is a notoriously challenging endeavor.

A more recent approach addressing brake squeal has relied upon an analysis procedure known as the "complex eigenvalue method" to diagnose the problem. The purpose of this method is to calculate the dynamic instability of the system due to both modal coupling and velocity-dependent friction. A complex eigenvalue analysis method is an iterative process involving commercially available software where a brake engineer may suggest a solution that involves modifying component geometry to shift natural frequencies, trying new materials or different damping treatments, or adding new devices to change boundary conditions or contact conditions. User experience and engineering judgment are essential to obtain favorable results using the complex mode analysis, and in recent years many efforts have been made to increase the predictability of the complex eigenvalue method.

Notwithstanding the usefulness of the complex eigenvalue method as a diagnosis tool, design engineers still do not fully understand the underlying mechanisms which cause brake squeal, and as a result continue searching for new and improved solutions that will completely, or at least substantially, eliminate the objectionable audible frequencies at the root of brake squeal.

SUMMARY OF THE INVENTION

The subject invention comprises a ventilated brake disc rotor for a vehicle braking system. The rotor comprises an annular inboard friction plate having a central axis, and an annular outboard friction plate spaced from the inboard friction plate and concentrically disposed about the central axis. A plurality of ribs are disposed between the inboard and outboard friction plates. The ribs are spaced from one another in regular circumferential increments about the central axis. A generally radially extending vent hole is defined in the space between adjacent ribs. The plurality of ribs are arranged in at least two arcuate sectors of equal angular measure. Each sector contains an attenuation region in which the regular spacing of the ribs is interrupted. A pin cluster is disposed in each attenuation region. The pin cluster includes a plurality of discrete pins disposed between the inboard and outboard friction plates and spaced one from another in offset radial locations within each attenuation region.

According to another aspect of the invention, a ventilated brake disc rotor for a vehicle braking system comprises an annular inboard friction plate having a central axis. An annular outboard friction plate is spaced from the inboard friction plate and is concentrically disposed about the central axis. A plurality of ribs are disposed between the inboard and outboard friction plates. The ribs are spaced one from another in regular circumferential increments about the central axis with a vent hole defined in the space between adjacent ribs. The plurality of ribs are arranged in at least two arcuate sectors of equal angular measure, each of the sectors containing an attenuation region in which the regular spacing of the ribs is interrupted. A pin cluster is disposed in the attenuation region and includes a plurality of discrete pins disposed between the inboard and outboard friction plates. The pins are spaced one from another, and at least one of the pins has a substantially circular cross-section.

According to yet another aspect of the invention, a ventilated brake rotor for a vehicle braking system is provided. The rotor comprises an annular inboard friction plate having a central axis. An annular outboard friction plate is spaced from the inboard friction plate and is concentrically disposed about the central axis. A plurality of ribs are disposed between the inboard and outboard friction plates. The ribs are spaced one from another in regular circumferential increments about the central axis with a vent hole defined in the space between adjacent ribs. The plurality of ribs are arranged in at least two arcuate sectors of equal angular measure. Each sector contains an attenuation region in which the regular spacing of the ribs is interrupted by the replacement of at least two adjacent ribs with a pin cluster including a plurality of discrete pins disposed between the inboard and outboard friction plates and spaced from one another.

Using the complex eigenvalue analysis method, a geometric configuration of the ventilated brake disc rotor including a pin cluster has been identified to be particularly effective in attenuating vibration modes in the objectionable, audible frequencies. The novel pin cluster configuration can be designed so as not to adversely affect the structural integrity, cooling capabilities or functional attributes of a ventilated brake disc rotor. Furthermore, the pin cluster configuration can be readily implemented with only minor alterations to existing rotor tooling. Thus, by altering the configuration of a vented disc brake rotor with the novel pin cluster, the likelihood of brake squeal is substantially reduced, thereby averting a negative consumer impression as to the quality of the vehicle and/or its braking system.

BRIEF DESCRIPTION OF THE DRAWINGS

These and other features and advantages of the present invention will become more readily appreciated when considered in connection with the following detailed description and appended drawings, wherein:

FIG. 2 is a front elevation view of a ventilated brake disc rotor according to the subject invention;

FIG. 3 is a cross-sectional view taken generally along lines 3-3 in FIG. 2;

FIGS. 8A through 20A illustrate alternative pin cluster configurations of the subject rotor which provide beneficial mode splitting characteristics;

FIGS. 8B through 20B comprise eigenvalue graphs for the respective pin cluster configurations of FIGS. 7A through 20A; and FIGS. 21A and 21B represent a pin cluster configuration which does not provide acceptable mode splitting properties, and thus appears to suggest an upper range of pin cluster configurations in which acceptable results can be achieved.

DETAILED DESCRIPTION OF THE PREFERRED EMBODIMENT

Figure 1:
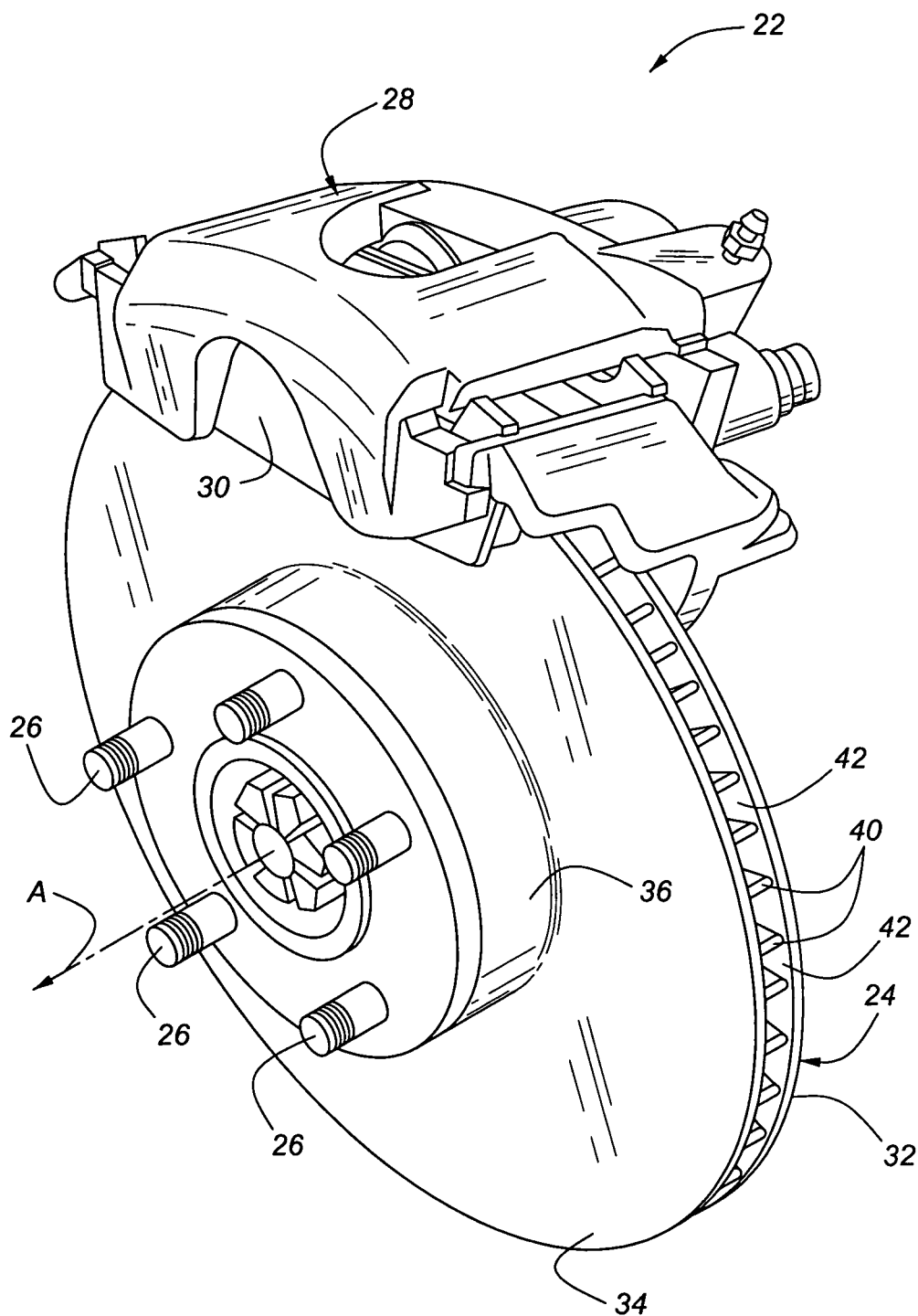
FIG. 1 is a perspective view of a ventilated brake disc assembly according to the invention.

Referring to the Figures, wherein like numerals indicate like or corresponding parts throughout the several views, a disc brake rotor assembly is generally shown at 22 in FIG. 1. The assembly 22 includes a rotor, generally indicated at 24, which is connected to an axle hub via lug bolts 26. A vehicle wheel, not shown, is attached over the lug bolts 26. A caliper, generally indicated at 28, carries a pair of brake friction pads 30 on opposite sides of the rotor 24. In response to hydraulic, pneumatic, electromechanical, or other actuating means activated by the vehicle operator, the disc brake pads 30 are squeezed into clamping contact with the opposing friction surfaces of the rotor 24 to arrest rotation of the wheel.

As perhaps best shown in FIGS. 2 through 4 and 7A, the rotor 24 is of the ventilated type including an annular inboard friction plate 32 which is centered about a central axis A. The central axis A is coincident with the rotational axis of the associated wheel. An annular outboard friction plate 34 is spaced from the inboard friction plate 32 and is concentrically disposed about the central axis A. The inner edge of the outboard friction plate 34, i.e., proximal to the central axis A, adjoins a central hub section 36. The hub section 36 contains four or more lug bolt holes 38 for receiving the lug bolts 26 and fastening the rotor 24 to the wheel.

A plurality of ribs 40 are disposed in the separation between the inboard 32 and outboard 34 friction plates. The ribs 40 are distanced one from another in regular circumferential increments about the central axis A. The regular spacing of the ribs 40 can be equal spacing, or a pattern of two or more spacings arranged in a repeating pattern. The ribs 40 can have the straight radial configuration shown in FIG. 2, or they can have skewed or curved configurations to promote air flow and thus improve cooling. Accordingly, the geometry of each rib 40 can take many forms within the context of this invention. Regardless of the specific geometric configuration of the ribs 40, a vent hole 42 is defined in the region between adjacent ribs 40. The purpose of the vent holes 42 are to conduct cooling air between the friction plates 32, 34 to convectively cool the rotor 24. The vent holes 42 have a generally radial extent with a proximal air opening 44 adjacent the inner edges of the friction plates 32, 34, and a distal air exit 46 adjacent the peripheral outer edges of the friction plates 32, 34.

The plurality of ribs 40 are arranged in at least two arcuate sectors 48 of equal angular measure. For illustrative purposes, the embodiment of FIGS. 2 through 4 and 7A demonstrate a rib 40 pattern which is divided into four sectors 48 each occupying 90°, or one-quarter, of the annular rotor real estate. If only two sectors 48 are incorporated, each sector would span 180° of the rotor 24. If six sectors 48 are employed, each sector 48 would occupy 60° of the rotor 24 real estate. Any number of plural sectors 48 can be incorporated into the rotor 24 with advantageous effect.

Figure 4:
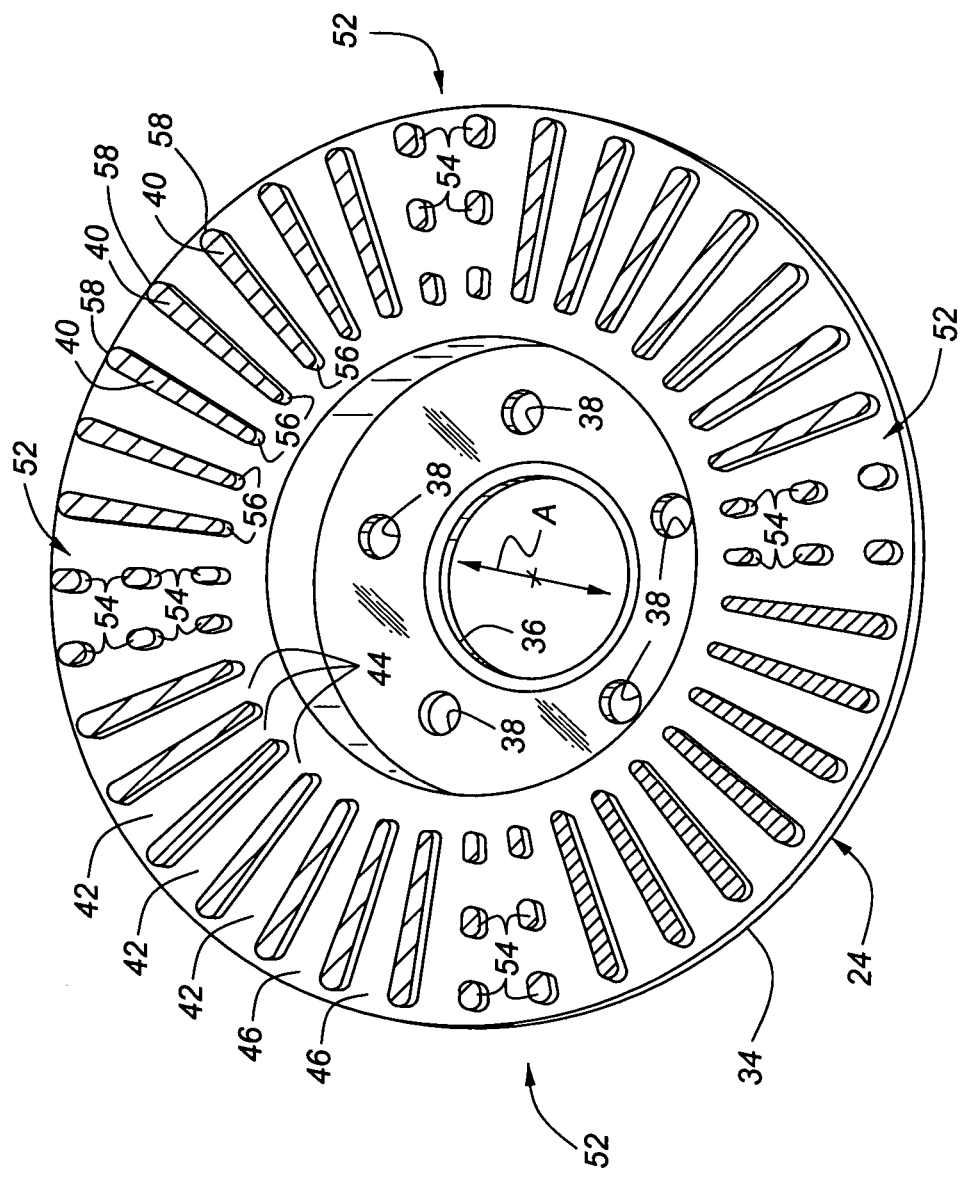
FIG. 4 is a cross-sectional view shown in perspective as taken generally along lines 4-4 in FIG. 3.
Figures 7A, 7B:
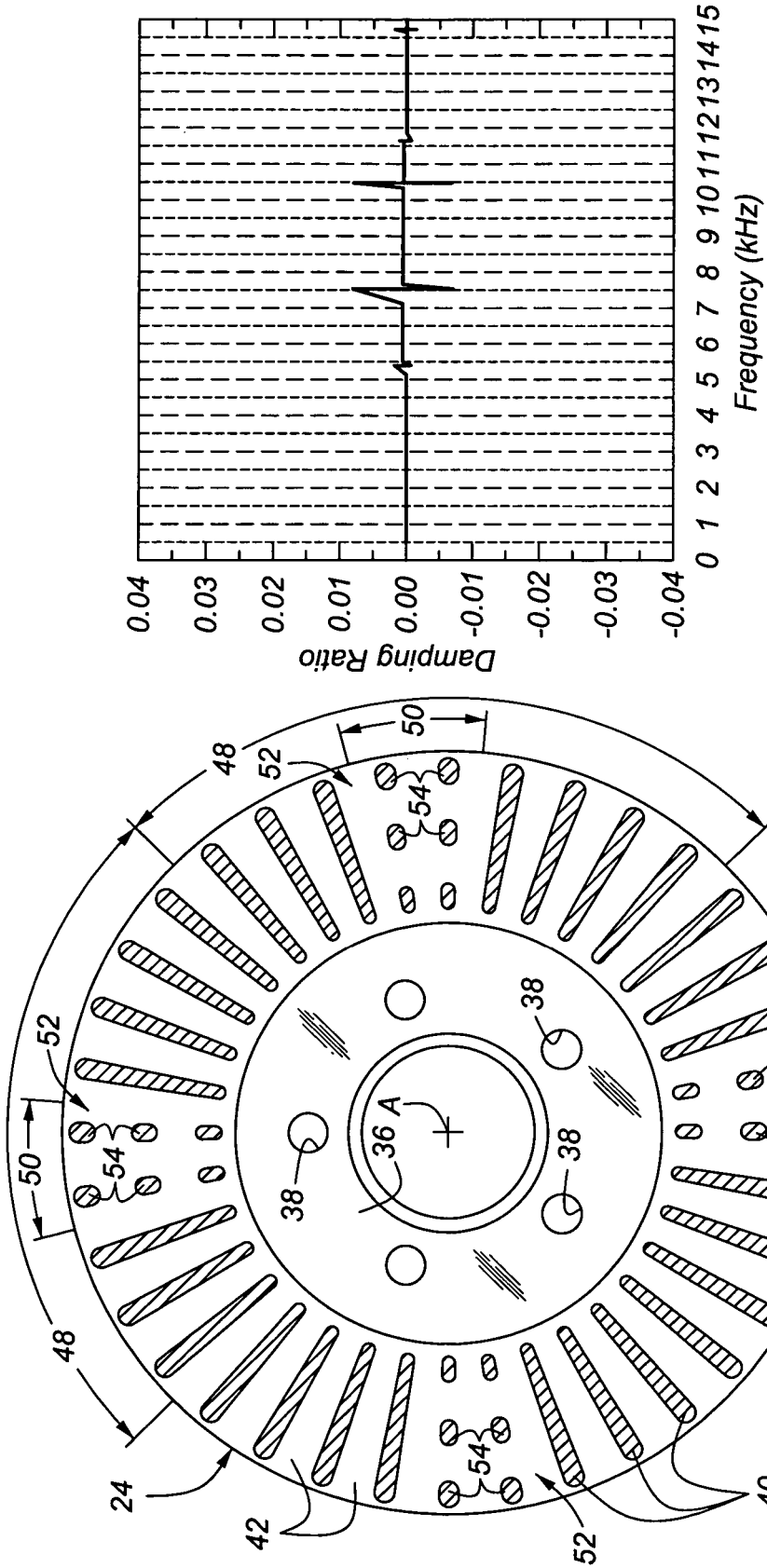
FIGS. 7A and 7B illustrate the pin cluster configuration as in FIGS. 2-4 and an associated eigenvalue graph.

Each sector 48 contains an attenuation region 50 in which the regular spacing of the ribs 40 is interrupted. As shown in FIGS. 2 and 4 and 7A, within each sector 48, the attenuation region 50 interrupts the regular spacing of the ribs 40 by replacing two adjacent ribs 40 with a pin cluster, generally shown at 52. The pin cluster 52 includes a plurality of discrete pins 54 disposed between the inboard 32 and outboard 34 friction plates and spaced from one another. The pins 54 are preferably arranged in offset radial locations within the attenuation region 50, such that a single radial, emanating from the central axis A, is not capable of passing through the center of all the pins 54. The pins 54 are notably smaller than the ribs 40, with the dimensions of any pin 54 in the radial direction being less than twice the maximum width of the adjacent ribs 40.

In this example, the ribs 40 are of equal radial length and spaced evenly about the circumference of the rotor 24. Thirty-six vent ribs 40 are distributed in 10° increments. Depending upon the intended application, however, more or less than thirty-six ribs 40 may be required. The pins 54 are here shown arranged in a first row of three pins 54 aligned radially and spaced 10°, on center, from an adjacent rib 40. A second row of three pins 54 is also aligned along a radial and spaced 10°, on center, from the first row of pins 54 and from the adjacent rib 40. Thus, the first and second rows each contain an equal number of pins 54 and are aligned in radials that correspond with the regular 10° rib 40 spacings. While the example here demonstrates two rows of pins 54, each row containing three pins 54, other arrangements are possible. For example, more than two radial rows of pins 54 can be used, and it is not necessary that the rows be arranged on radial increments which correspond to the regular spacing of the ribs 40. Furthermore, each pin row can comprise less than three or more than three pins 54, as may be determined advantageous for a particular application or set of operating conditions by actual testing, complex eigenvalue analysis, or other analytical methods.

The pins 54 are configured with a substantially oval cross-section whose radial length is substantially equal among all of the pins 54 in the pin cluster 52, but whose breadth, in the circumferential direction relative to the central axis A, varies progressively from narrow proximal the central axis A to wide distal from the central axis A. In this embodiment, the breadth of each pin 54 substantially equals to the breadth of a rib 40 at the same radial location. In other words, as the ribs 40 are here shown having a generally tapered configuration, the pins 54 in any radial row are shaped in a generally consistent fashion.

The pin clusters 52 have been found to be particularly effective in eliminating, or at least markedly reducing, noise associated with rotor resonance, via the process known as mode splitting at objectionable frequency values and in certain vibration modes. The angular expanse of the attenuation region 50, relative to the sector 48 in which it resides, may be noteworthy. As shown in FIG. 2, favorable results have been predicted when the attenuation region 50 occupies an angular territory which is at least 20% of the surface area represented by the sector 48 in which it resides. Through complex eigenvalue analysis, it has also been predicted that the attenuation region 50 should occupy less than 55% of the surface area represented by the sector 48 in which it resides. Thus, if the sector 48 spans an arc of 90°, the attenuation region 50 will occupy a territory spanning at least 18° but less than 49½°. If the sector 48 spans 120°, the attenuation region 50 will occupy a territory of at least 24° but less than 66°, and so forth. These ranges are merely expected to be preferable, and in any event the attenuation region 50 cannot be so large as to diminish the structural and functional capabilities of the rotor 24. The determination of appropriate span for the sectors 48, together with that of the accompanying attenuation regions 50, is made after the mode shape of the primary frequency to be addressed has been identified. The approach known as mode splitting is thus employed to determine how best to disrupt the rotor 24 geometry at specified intervals. The number of sectors 48 may depend upon the frequency values to be addressed. For example, frequency values in the objectionable range of about 10,500 hertz, plus or minus, may suggest dividing the ribs 40 into four sectors 48 of 90° each. However, this is not a rule and for any given configuration, more or less than four sectors 48 may yield better predictions.

Within the attenuation region 50, the pin cluster 52 is preferably congregated so that each pin 54 does not extend beyond the radial extent of an adjacent rib 40. Thus, if each rib 40 is identified as having a radially proximal end 56 and a radial distal end 58, relative to the central axis A, then the pins 54 in each pin cluster 52 are preferably spaced radially from the central axis A not less than the proximal end 56 of the ribs 40 and not greater than the distal end 58 of the ribs 40. However, this distinction is not universal, since in some applications the ribs 40 may be composed of alternating large and small ribs, or may be irregularly shaped in some fashion.

Figure 5B:
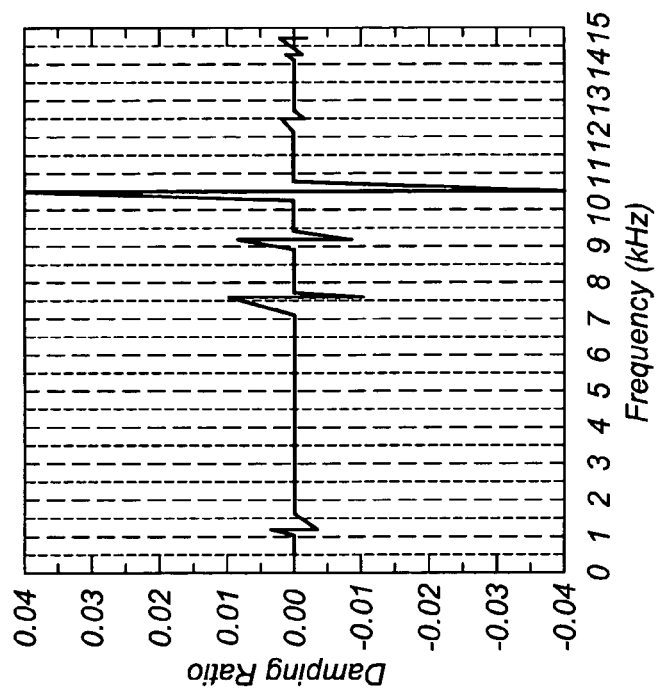
FIG. 5B is an eigenvalue graph for the disc brake rotor of FIG. 5A developed using the complex mode analysis method.
Figure 5A:
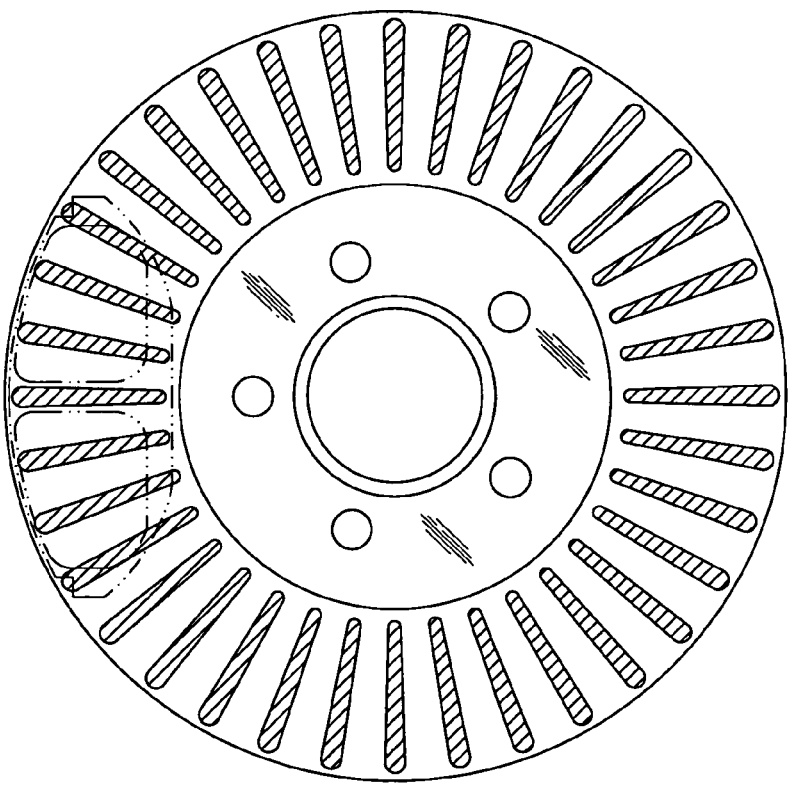
FIG. 5A is a front elevation view showing a typical prior art ventilated brake disc rotor.

FIG. 5A depicts a typical prior art disc brake rotor in which the ribs are not arranged in sectors, nor are there provided any form of attenuation region or pin cluster. When such a prior art rotor is subjected to complex eigenvalue analysis, the graph of FIG. 5B can be created for a given frequency range. The eigenvalue graph here represents the dampening ratio of the calculated eigenvalues, and the amplitude at given frequencies is indicative of the tendency toward resonance, or noise, at the specified frequency for a brake disc of this configuration. In FIG. 5B, a particularly severe spike is indicated at a mode which corresponds to a frequency of about 10,500 hertz. This spike results in an excessive eigenvalue and predicts a harsh squealing noise which would likely be audible to passengers in the vehicle. Although not a safety concern, the objectionable squealing noise is distracting, and may contribute to a negative perception of the quality of the vehicle and/or its braking system. A particular focus of this invention is to eliminate or at least substantially reduce spikes in the calculated dampening ratio of the eigenvalue for a given disc brake rotor 24 at objectionable frequencies within the audible realm.

Figure 6B:
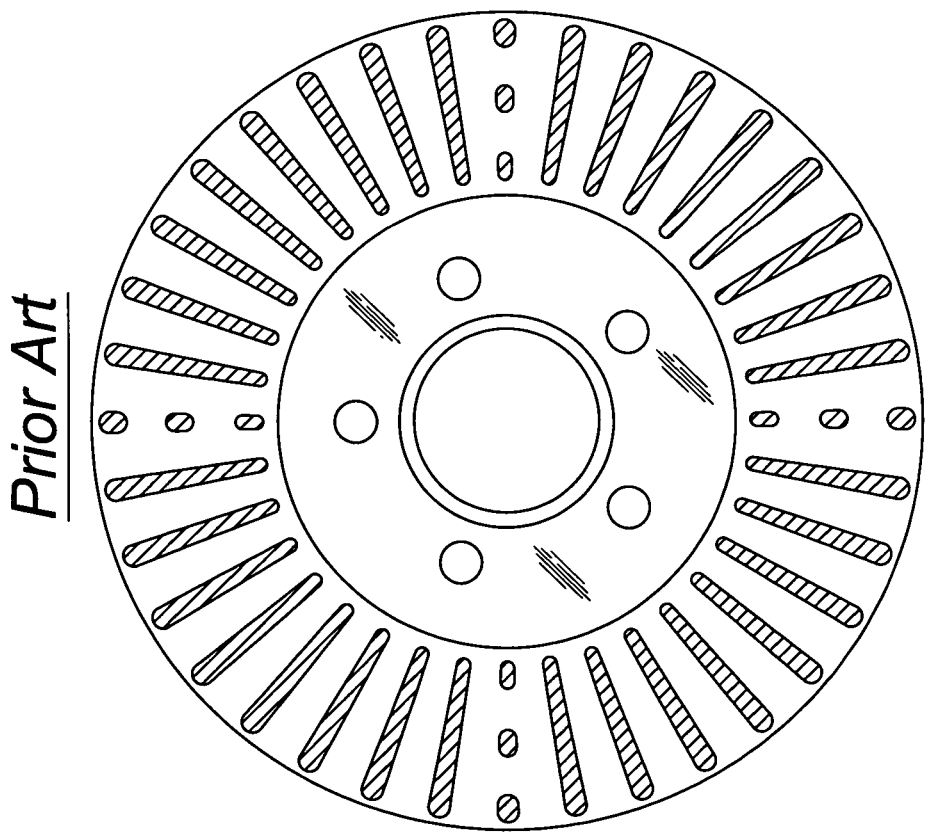
FIG. 6B is an eigenvalue graph for the disc brake rotor of FIG. 6A.
Figure 6A:
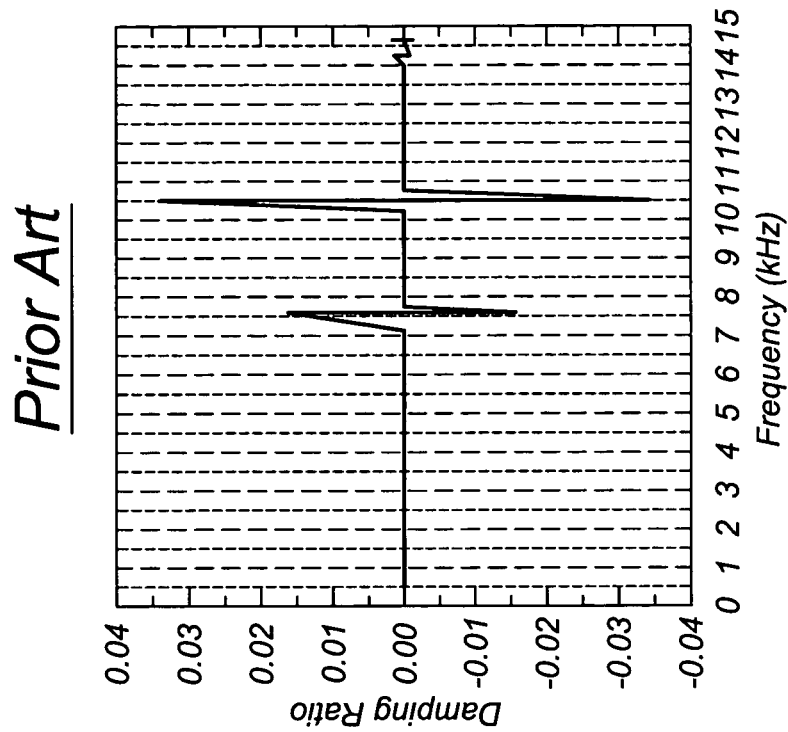
FIG. 6A is a front elevation view of another prior art ventilated disc rotor configuration.

FIGS. 6A and B depict another prior art style rotor in which ribs in four locations have been replaced with a single row of non-circular pins. Here, the corresponding eigenvalue graph shown in FIG. 6B predicts a slightly reduced yet still severe spike at a mode corresponding to a frequency of about 10,500 hertz. As in the preceding example, this frequency spike also indicates the likelihood of a harsh squealing noise which would be audible to passengers in the vehicle. Thus, even though the prior art, has proposed replacing discrete ribs with oval or elliptical shaped pins, none of these attempts have been successful in addressing the issue of brake squeal when subjected to the latest analytical methods, such as complex eigenvalue analysis and mode splitting.

Because brake squeal is a result of so many variables, not all of which are fully understood, predictive solutions to address brake squeal have been difficult and not always intuitive. Indeed, the prior art has made many attempts to address this issue by attacking the problem from different angles. Some prior art literature has suggested that adding mass to the rotor section will solve the objectionable noise issues, however, added mass is not helpful in terms of rotor cooling. Furthermore, the issue of rotor stiffness has remained an area of concern to the design engineer due to the harsh mechanical and thermal conditions under which a disc brake assembly is expected to operate. The subject invention departs from conventional approaches and general wisdom by removing weight from the rotor 24 via the elimination of selected ribs 40 within the attenuation region 50. This departure from conventional wisdom is further emphasized by the potential for the pin cluster 52 within the attenuation region 50 to negatively effect rotor stiffness. However, by arraying the pins 50 in radially offset locations, the stiffness and associated structural concerns can be balanced against the positive attenuation effects achieved by the novel configurations.

FIG. 7A represents a rotor 24 substantially as described above in connection with FIGS. 2 through 4. An eigenvalue graph for the rotor 24 depicted in FIG. 7A is shown in FIG. 7B. Here, the mode corresponding to a frequency of about 10,500 hertz has been almost completely attenuated. Thus, this eigenvalue graph predicts, for all practical purposes, an effective and total solution to the brake squeal phenomenon.

Figures 8A, 8B:
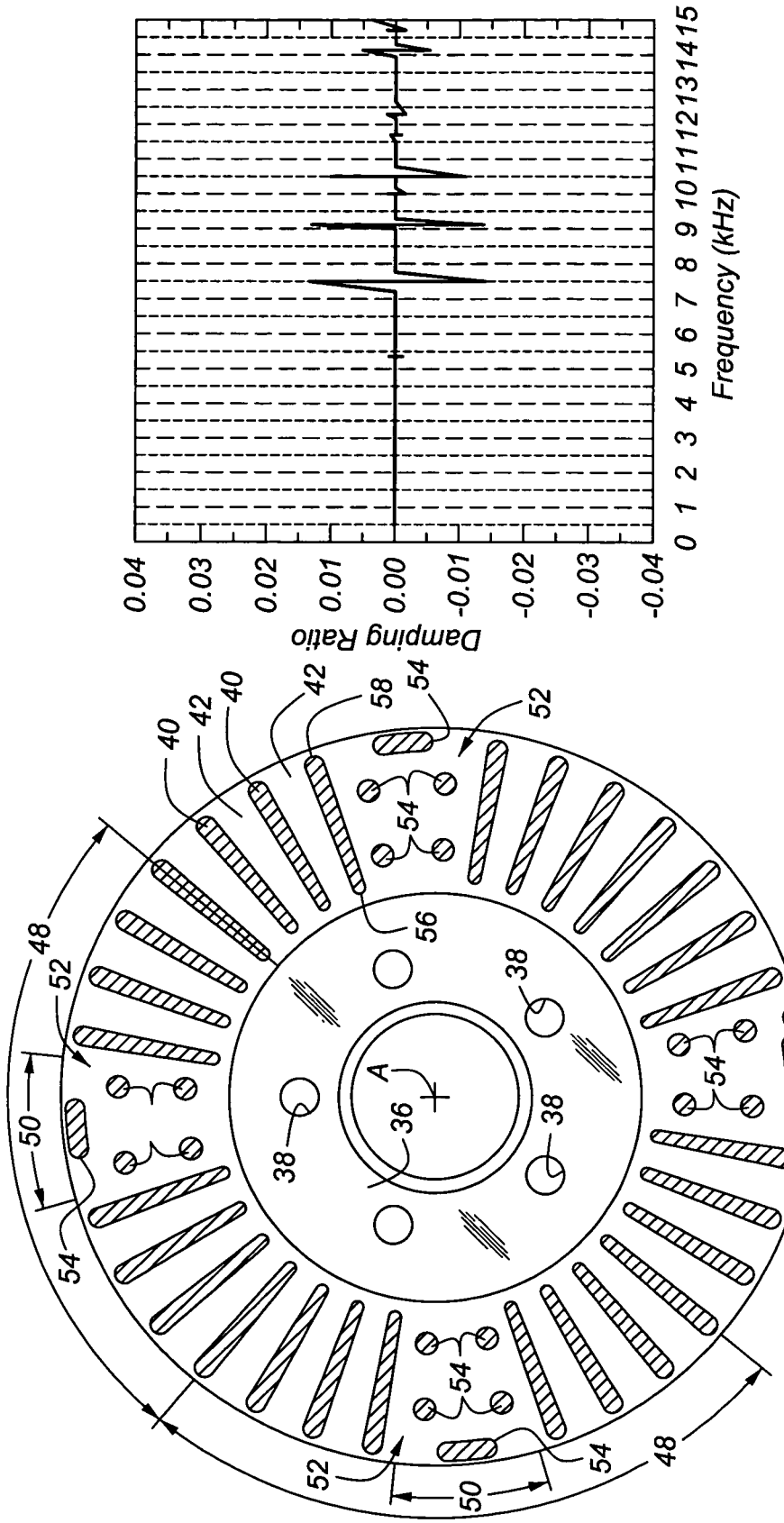
Figure 10B:
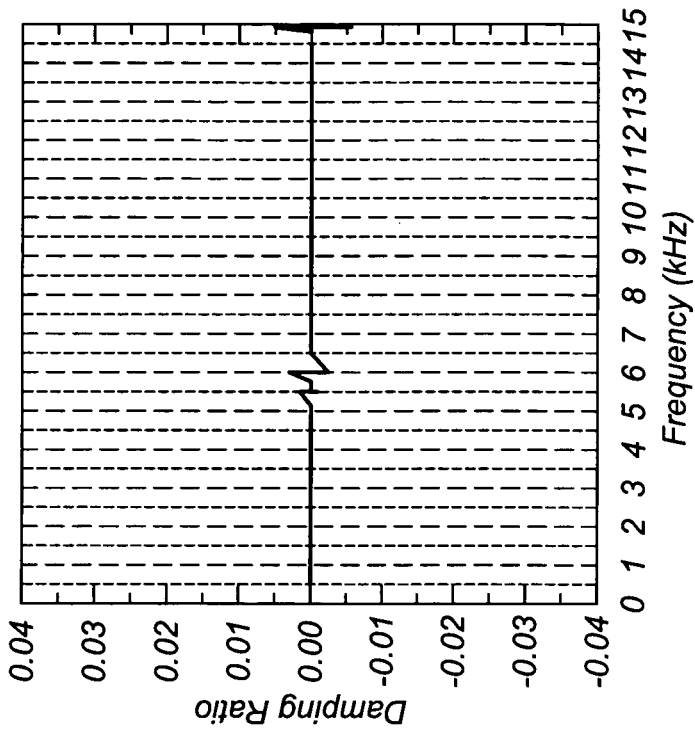
Figure 10A:
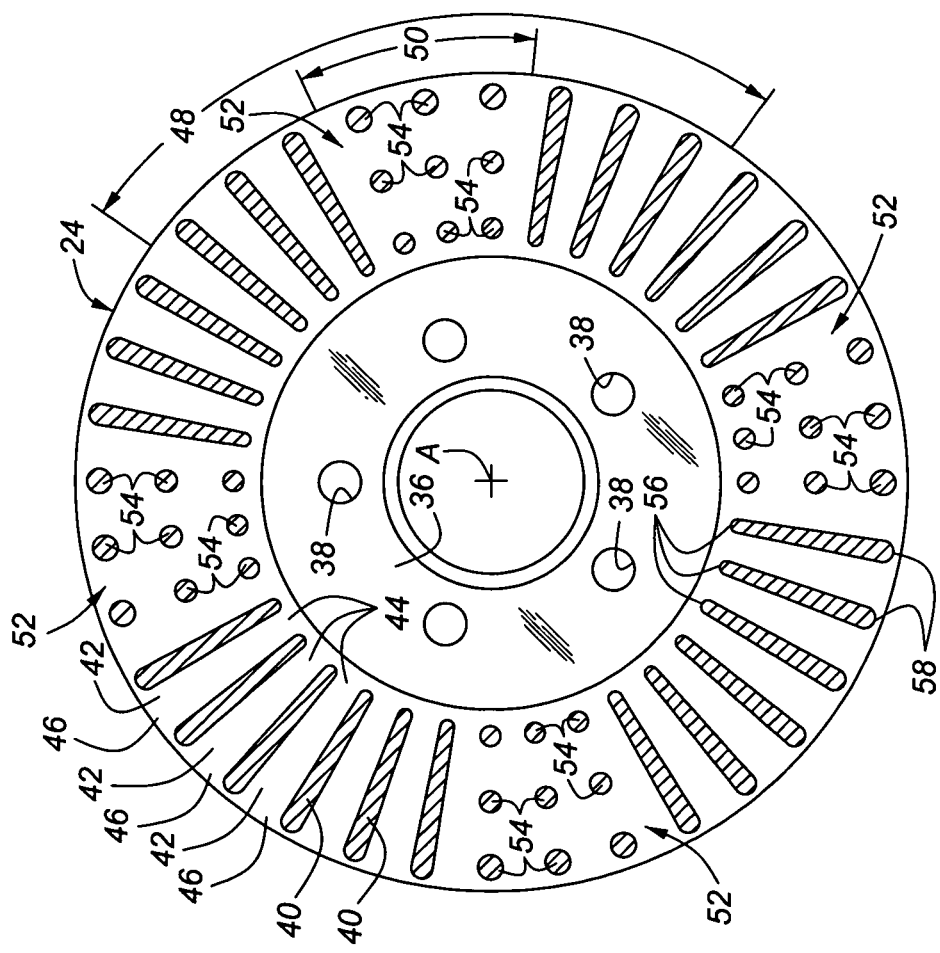
Figures 11A, 11B:
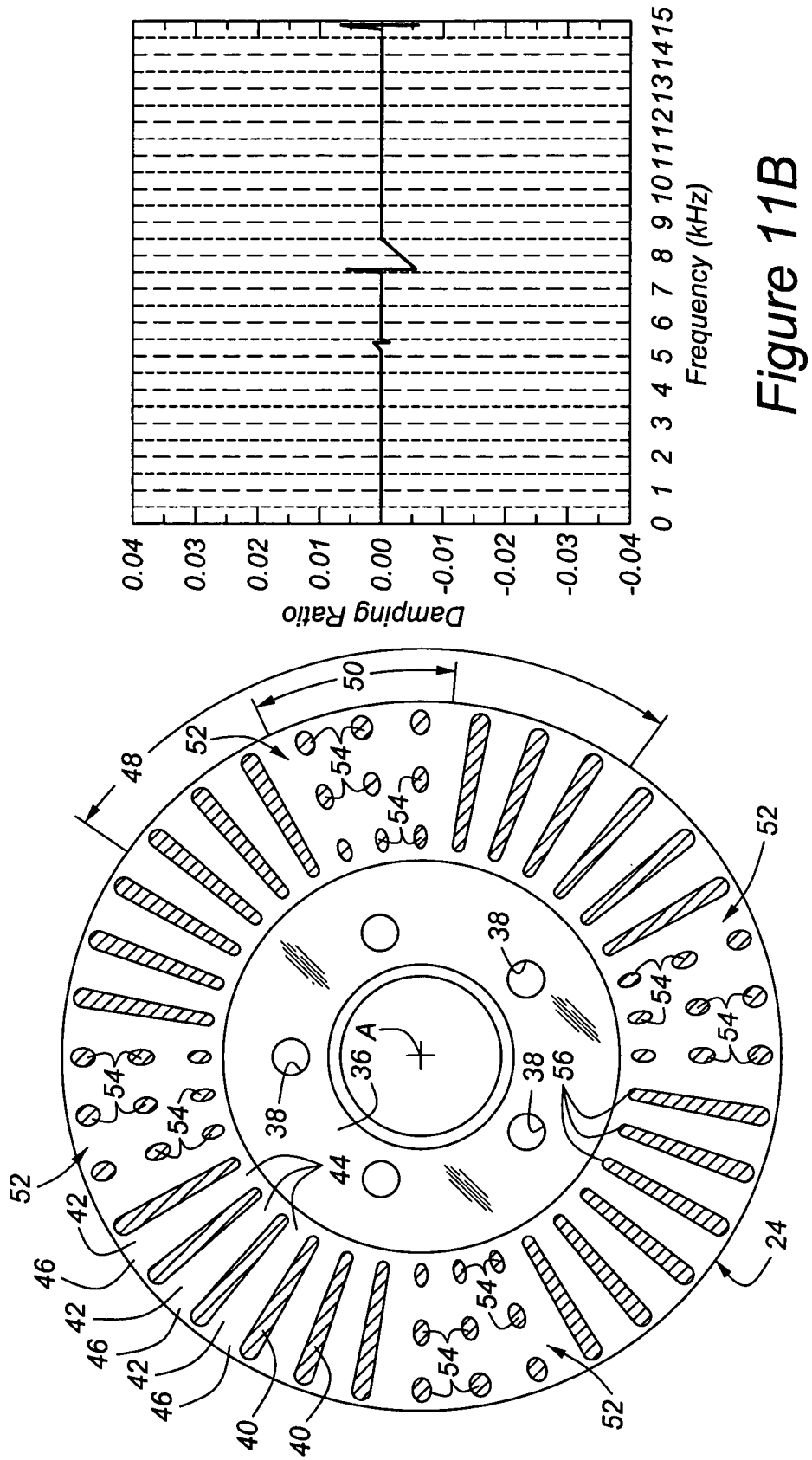
Figures 12A, 12B:
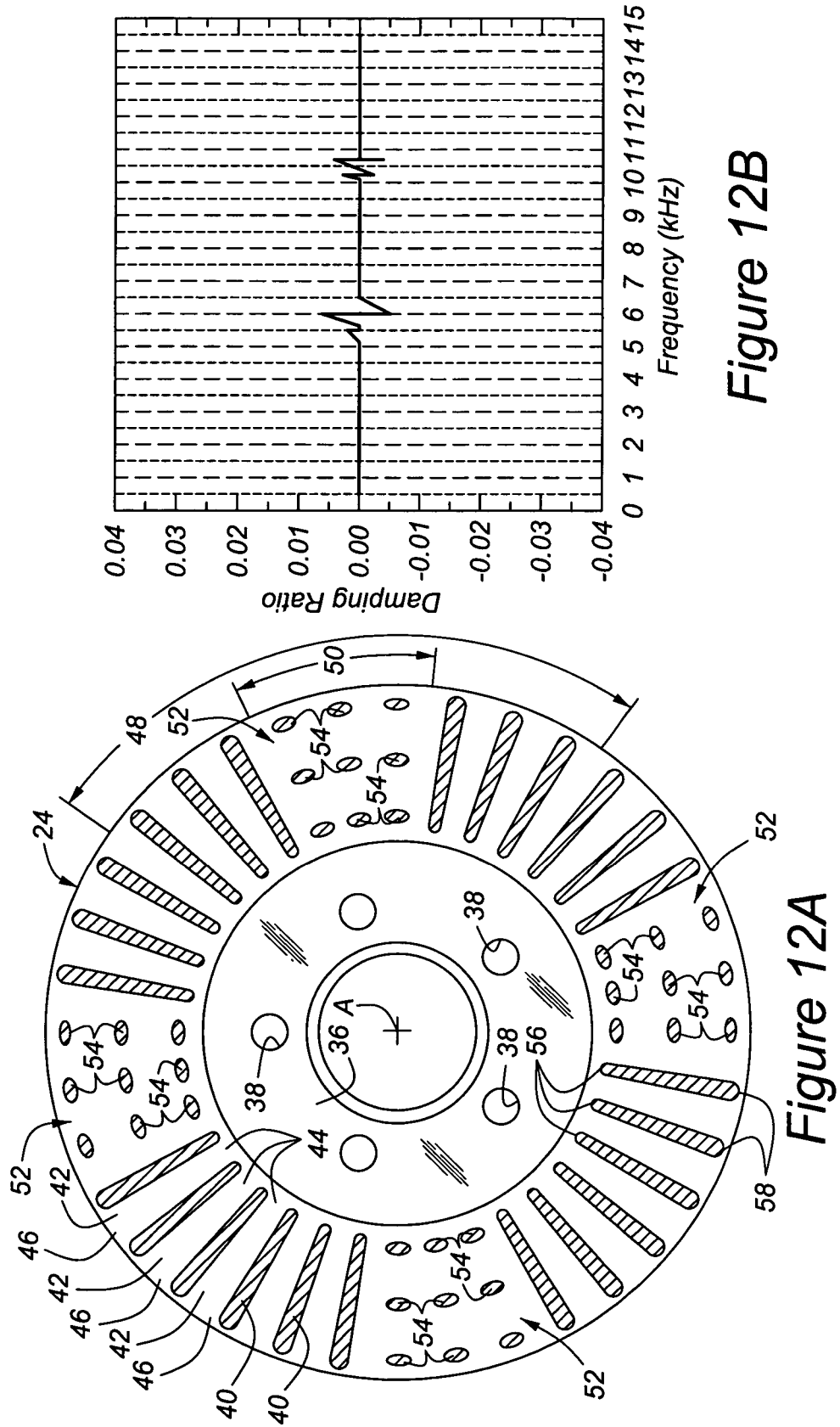

FIG. 8A depicts an alternative configuration for the arrangement of pins 54 within the pin cluster 52 by providing, within each attenuation region 50, two radial rows of two pins 54 each plus a widened central pin 54 set in an extreme distal location. Furthermore, the arcuate spacing between each row of side pins 54, and in relation to the flanking ribs 40, is not consistent. In other words, if the ribs 40 shown in FIG. 8A are regularly spaced 10° one from another, the pins 54 in each radial row are spaced greater than 10° from each other and less than 10° from the adjacent ribs 40. As shown in FIG. 8B, which is an eigenvalue graph for the rotor depicted in FIG. 8A, the amplitude at the objectionable frequency of 10,500 hertz, plus or minus, has been substantially and effectively attenuated below the troublesome dampening ratio. Thus, the pin cluster 52 as represented in FIG. 8A achieves a substantial and effective solution to the predicted brake squeal characteristics of the prior art rotors shown in FIGS. 5A and 6A. Furthermore, the pins 54 in FIG. 7A are shown have each a generally circular cross-section. The generally circular cross-section is believed to contribute to the beneficial attenuation affects.

FIG. 9A provides an alternative configuration for each of the pins 54, in which their cross-section has been adjusted slightly by providing a width, in the circumferential direction, which is greater than their width in the radial direction. The associated eigenvalue graph is shown in FIG. 9B. The small spike indicated at mode corresponding to a frequency of 10,562 hertz is shown well within an acceptable dampening ratio, as compared to unacceptable spikes present at corresponding frequencies in the prior art designs.

FIGS. 10A through 12A depict various pin cluster 52 configurations, in which three radial rows of three pins 54 each are proposed. An eigenvalue graph associated with each configuration is shown in the respective FIGS. 10B through 12B. In all configurations, the eigenvalue graph indicates the total absence of spikes at objectionable frequencies. Thus, a rotor 24 configured according to any of these designs will substantially eliminate the objectionable high-pitched sound known as brake squeal. In these examples, the cross-section of the individual pins 54 is shown as circular, elliptical, and oval, with favorable results being achieved by all designs.

Figures 13A, 13B:
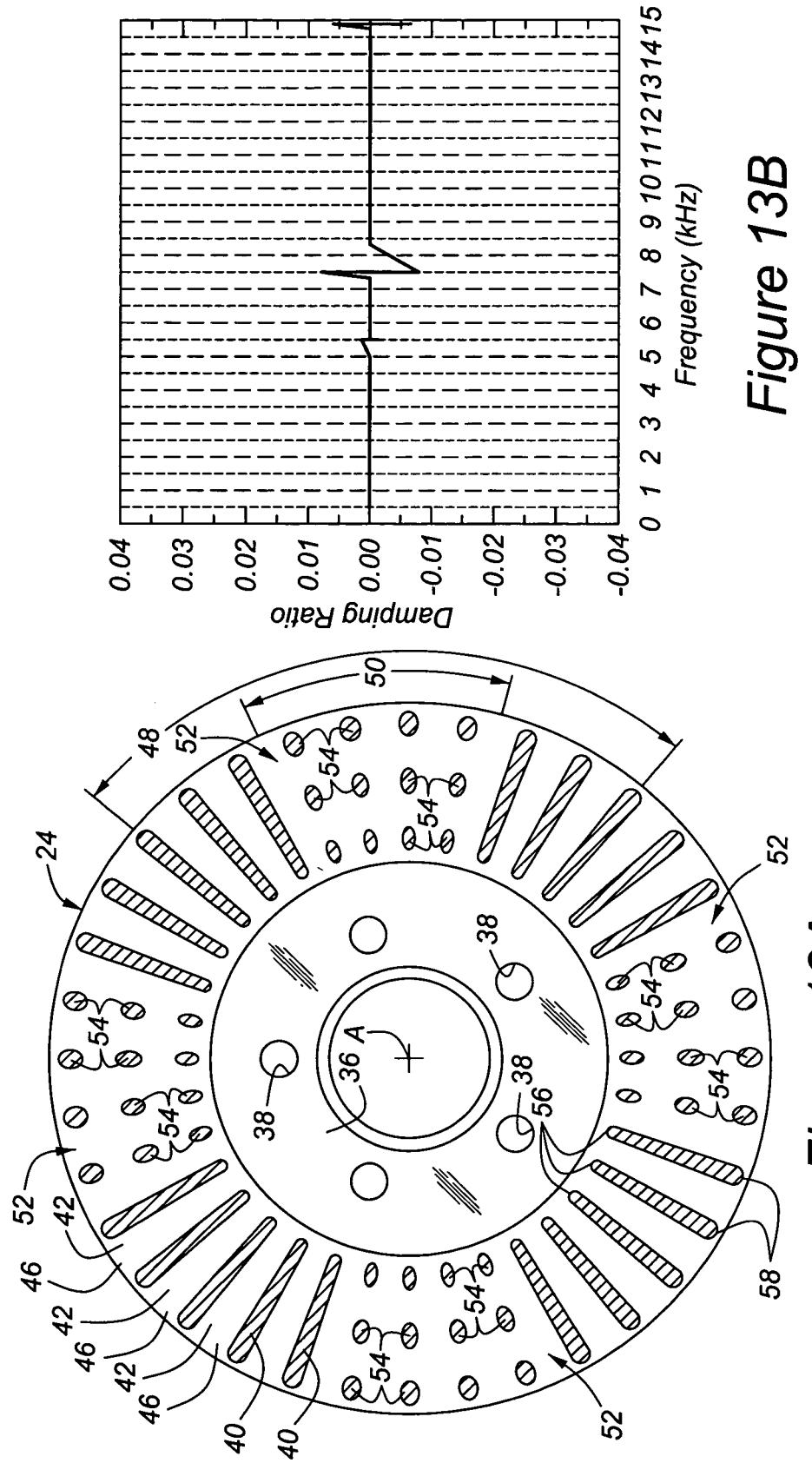
Figures 14A, 14B:
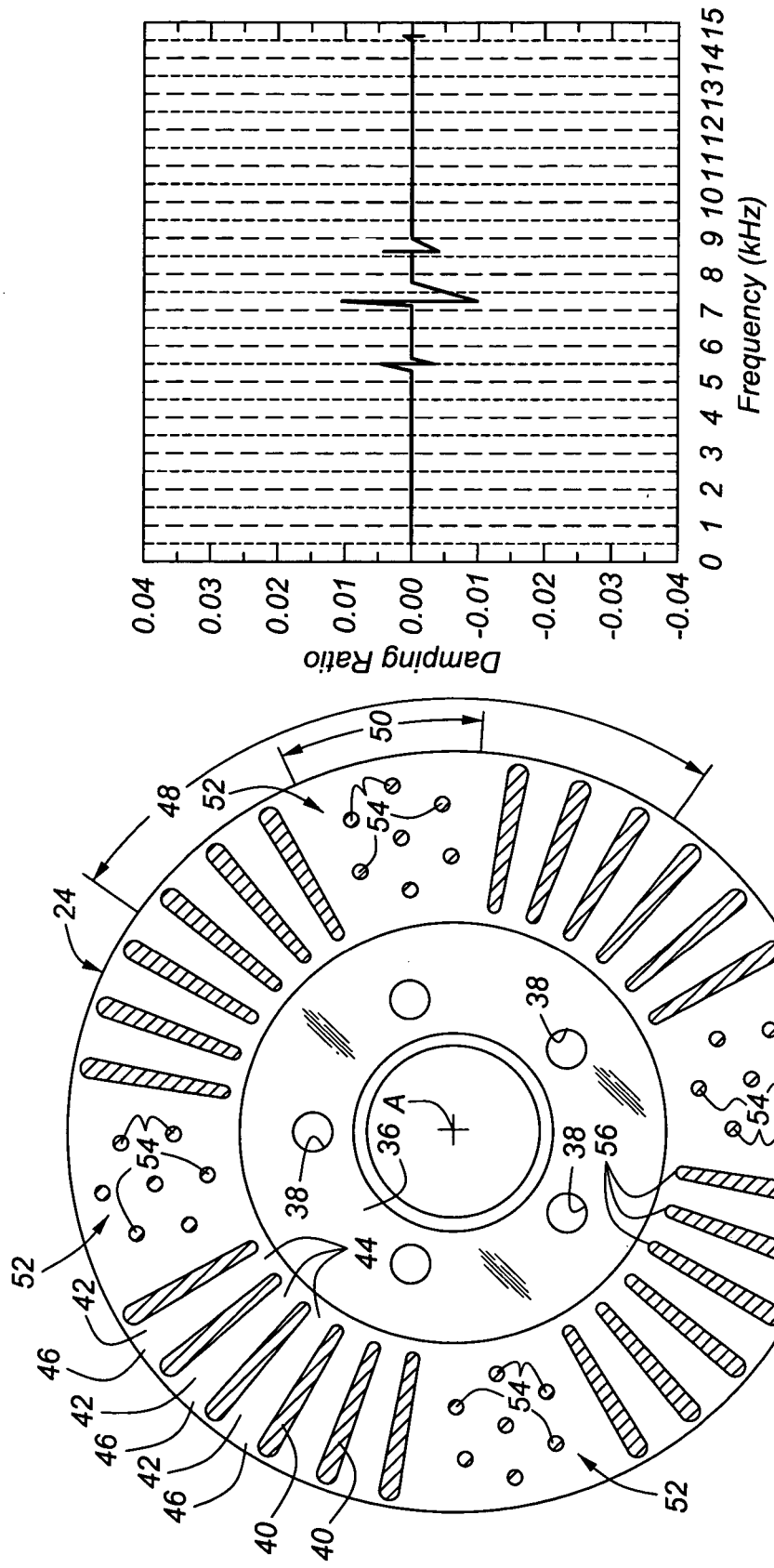
Figure 16B:
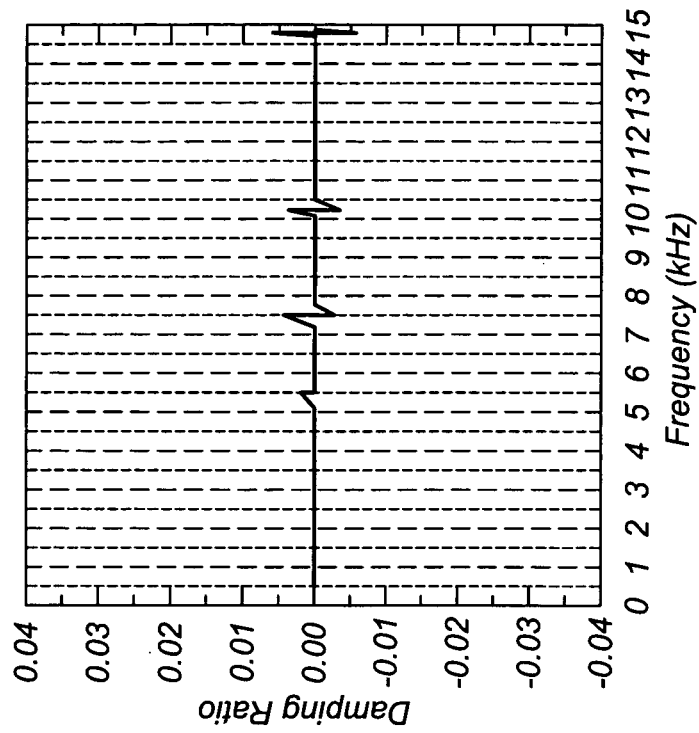
Figure 16A:
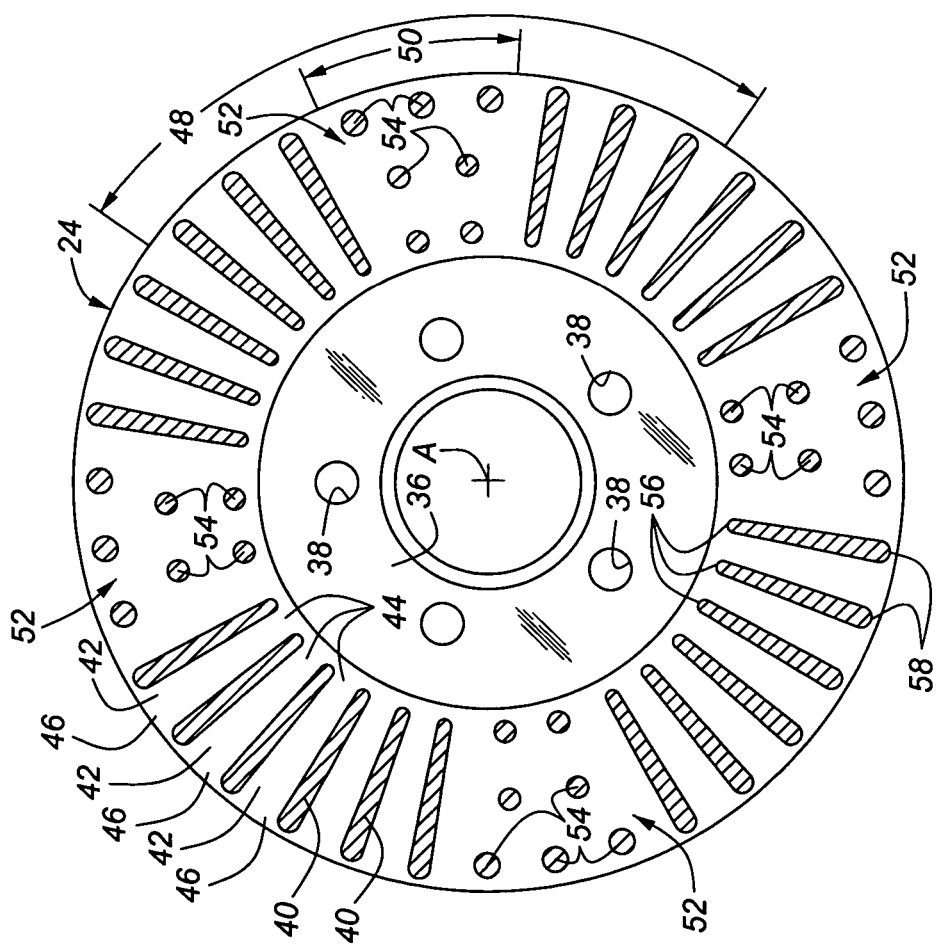
Figures 17A, 17B:
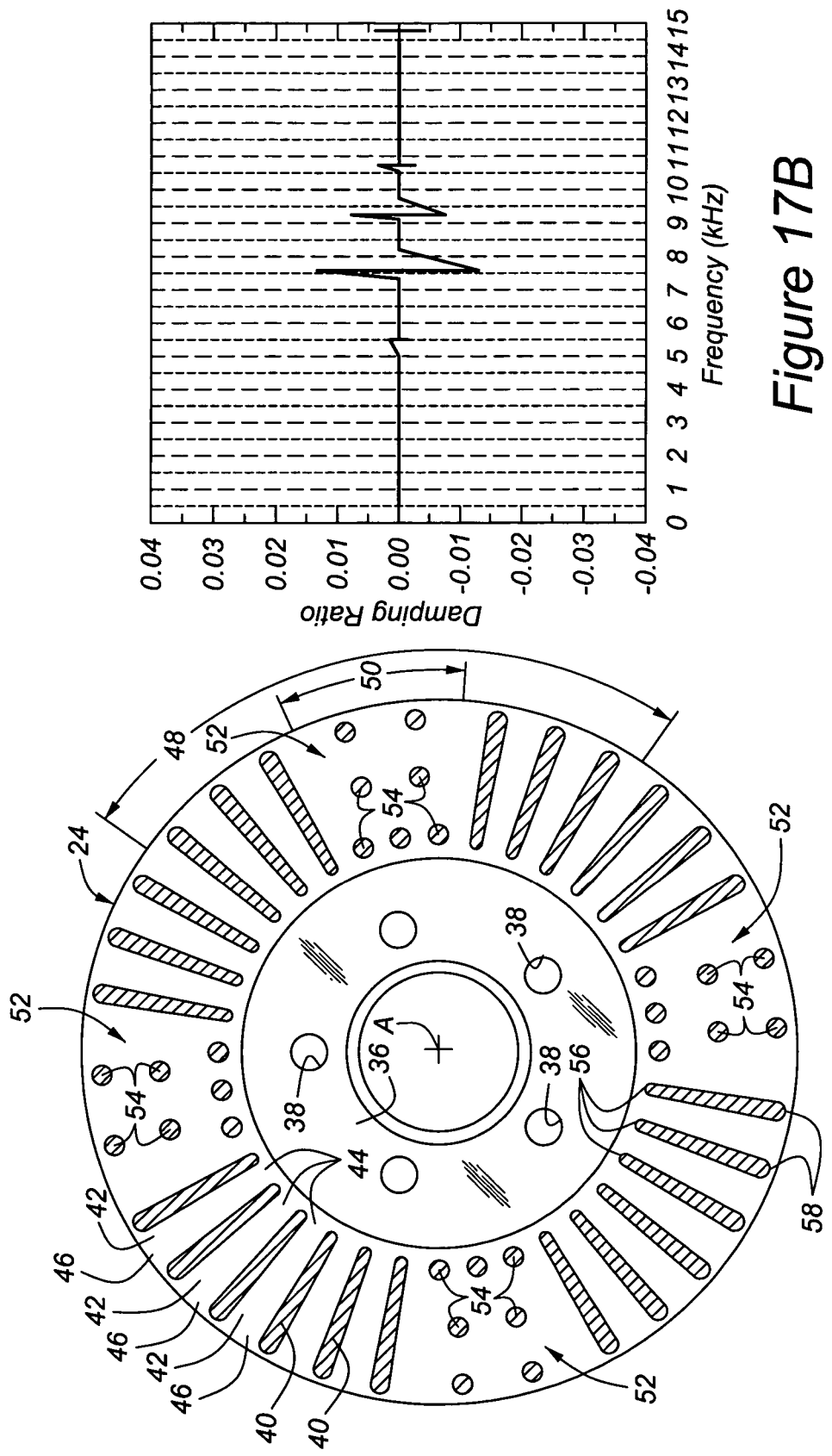
Figure 18B:
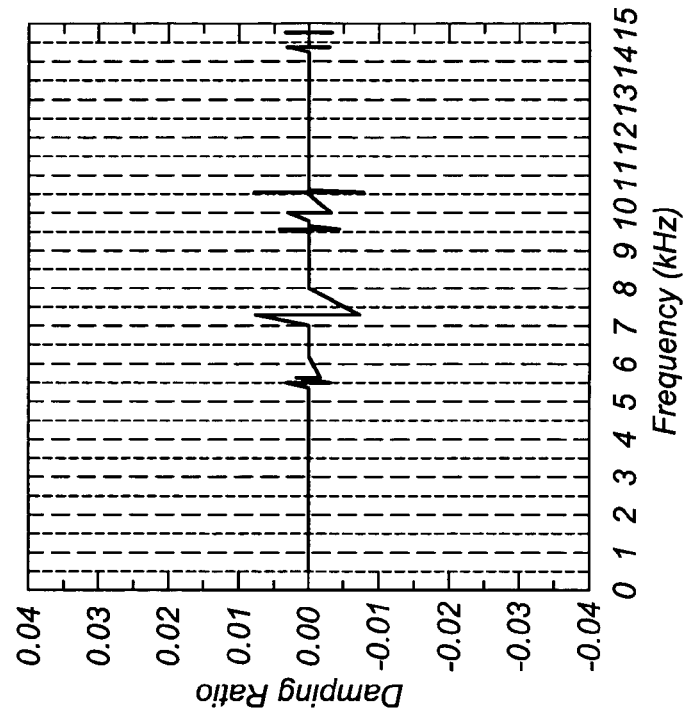
Figure 18A:
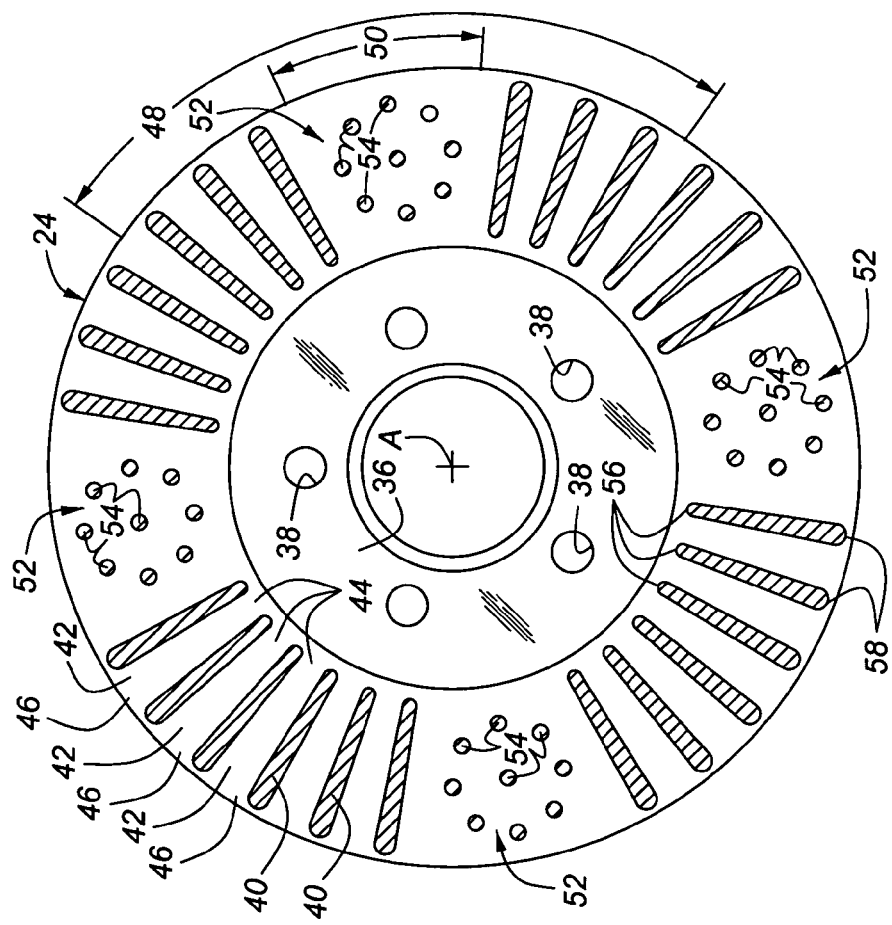

FIG. 13A illustrates a further alternative configuration of the pin cluster 52, in which the attenuation region 50 interrupts and replaces four ribs 40 within each sector 48. Here, the attenuation region 50 occupies 40° out of each 90° sector 48, thus resulting in a 44% occupation of the real estate within each sector 48. As shown by the associated eigenvalue graph in FIG. 13B, the amplitude of frequency spikes remains controlled.

Figures 19A, 19B:
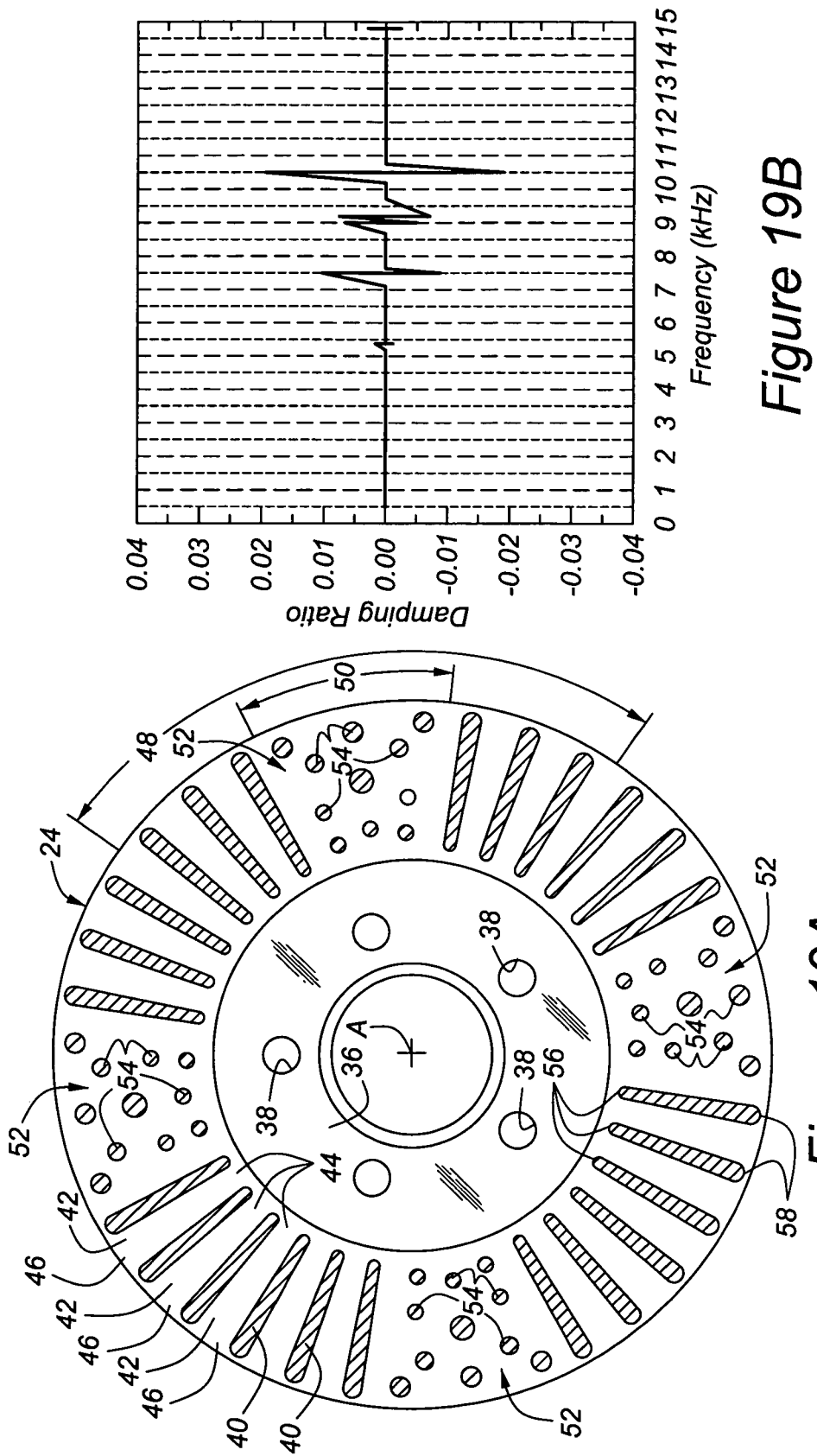

In all of the preceding examples, the pins 54 in each pin cluster 52 have been arranged in repeating radial rows. However, this is not necessary as depicted in the examples of FIGS. 14A through 20A. In these examples, numerous arrangements of pins 54 in various mixed and geometric patterns have been associated with corresponding eigenvalue graphs which predict, in each configuration, eigenvalue components well within the range of acceptable dampening ratio limits. FIGS. 14A through 20A deploy pins 54 having circular cross-sections. FIG. 19A is useful in illustrating that the diameter of each pin 54 need not necessarily be equal within any given pin cluster 52. Of course, elliptical, oval, or other cross-sectional shapes can be substituted for the pins 54 illustrated in these examples, with favorable results expected.

FIG. 21A represents a rotor 24 in which the attenuation region 50 occupies 55½% of the real estate within the sector 48. Specifically, the attenuation region 50 spans 50° within a 90° sector 48. The associated eigenvalue graph is shown in FIG. 21B. Here, a frequency spike at approximately 10,000 hertz demonstrates an amplitude which approaches unacceptable limits. Thus, it is possible that the attenuation region 50 is best limited to arcuate expanses which occupy less than 55% of the territory within any given sector 48.

Obviously, many modifications and variations of the present invention are possible in light of the above teachings. It is, therefore, to be understood that within the scope of the appended claims, the invention may be practiced otherwise than as specifically described.

What is claimed is:

1. A ventilated brake disc rotor for a vehicle braking system, said rotor comprising:
an annular inboard friction plate having a central axis;
an annular outboard friction plate spaced from said inboard friction plate and concentrically disposed about said central axis;
a plurality of ribs disposed between said inboard and outboard friction plates, said ribs spaced one from another in regular circumferential increments about said central axis with a generally radially extending vent hole defined in the space between adjacent ribs;
said plurality of ribs being arranged in four arcuate sectors of equal angular measure, each of said sectors containing an attenuation region in which the regular spacing of said ribs is interrupted, each said attenuation region occupying at least 20% but not more than 55% of the surface area represented by the respective said sector;
a pin cluster disposed in each said attenuation region, each said pin cluster including at least two distinct rows of radially aligned pins; said pins disposed in-between and interconnecting said inboard and outboard friction plates, said pins in each said pin cluster being at least six in number and spaced both radially and circumferentially from one another; and
said at least two rows of pins in each said pin cluster containing an equal number of pins, each said row including a radially innermost pin, a radially intermediate pin and a radially outermost pin; the circumference of each radially intermediate pin being greater than the circumference of each radially innermost pin, and the circumference of each radially outermost pin being greater than the circumference of each radially intermediate pin.

2. The rotor as set forth in claim 1 wherein each of said pins has a generally circular cross-section.

3. The rotor as set forth in claim 1 wherein at least one of said pins has a generally elliptical cross-section.

4. The rotor as set forth in claim 1 wherein at least one of said pins has a generally oval cross-section.

5. The rotor as set forth in claim 1 wherein each of said ribs has a radially proximal end and a radially distal end relative to said central axis, each of said proximal ends being spaced equidistant from said central axis and each of said distal ends being spaced equidistant from said central axis; said pins in each of said pin clusters being spaced radially from said central axis not less than said proximal ends of said ribs and not greater than said distal ends of said ribs.

6. The rotor as set forth in claim 1 wherein said pins have a length measured along a radial direction less than twice the maximum width of an adjacent said rib measured along a circumferential direction.

7. The rotor as set forth in claim 1 wherein said radially innermost, intermediate and outermost pins in each said row of each said pin cluster are spaced equidistantly apart.

8. The rotor as set forth in claim 1 wherein each said pin cluster includes at least three distinct rows of said pins radially aligned within the respective said attenuation region.

9. A ventilated brake disc rotor for a vehicle braking system, said rotor comprising:
an annular inboard friction plate having a central axis;
an annular outboard friction plate spaced from said inboard friction plate and concentrically disposed about said central axis;
a plurality of ribs disposed between said inboard and outboard friction plates, said ribs spaced one from another in regular circumferential increments about said central axis with a generally radially extending vent hole defined in the space between adjacent ribs;
said plurality of ribs being arranged in four arcuate sectors of equal angular measure, each of said sectors containing an attenuation region in which the regular spacing of said ribs is interrupted, each said attenuation region occupying at least 20% but not more than 55% of the surface area represented by the respective said sector;

a pin cluster disposed in each said attenuation region, each said pin cluster including three distinct rows of radially aligned pins; said pins disposed in-between and interconnecting said inboard and outboard friction plates, said pins in each said pin cluster being at least nine in number and spaced both radially and circumferentially from one another; and said three rows of pins in each said pin cluster containing an equal number of pins each having a generally circular cross-section, each said row including a radially innermost pin, a radially intermediate pin and a radially outermost pin; the diameter of each radially intermediate pin being greater than the diameter of each radially innermost pin, and the diameter of each radially outermost pin being greater than the diameter of each radially intermediate pin.

10. The rotor as set forth in claim 9 wherein each of said ribs has a radially proximal end and a radially distal end relative to said central axis, each of said proximal ends being spaced equidistant from said central axis and each of said distal ends being spaced equidistant from said central axis; said pins in each of said pin clusters being spaced radially from said central axis not less than said proximal ends of said ribs and not greater than said distal ends of said ribs.

11. The rotor as set forth in claim 9 wherein said pins have a diameter less than twice the maximum circumferential width of an adjacent said rib.

12. The rotor as set forth in claim 9 wherein said radially innermost, intermediate and outermost pins in each said row of each said pin cluster are spaced equidistantly apart.

* * * * *